US011397841B2

(12) United States Patent
Hasegawa

(10) Patent No.: US 11,397,841 B2
(45) Date of Patent: Jul. 26, 2022

(54) SEMICONDUCTOR INTEGRATED CIRCUIT, CIRCUIT DESIGNING APPARATUS, AND CIRCUIT DESIGNING METHOD

(71) Applicants: Kabushiki Kaisha Toshiba, Tokyo (JP); Toshiba Electronic Devices & Storage Corporation, Tokyo (JP)

(72) Inventor: Tetsu Hasegawa, Yokohama Kanagawa (JP)

(73) Assignees: KABUSHIKI KAISHA TOSHIBA, Tokyo (JP); TOSHIBA ELECTRONIC DEVICES & STORAGE CORPORATION, Tokyo (JP)

( * ) Notice: Subject to any disclaimer, the term of this patent is extended or adjusted under 35 U.S.C. 154(b) by 0 days.

(21) Appl. No.: 17/011,116

(22) Filed: Sep. 3, 2020

(65) Prior Publication Data

US 2021/0279391 A1 Sep. 9, 2021

(30) Foreign Application Priority Data

Mar. 5, 2020 (JP) .............................. JP2020-037554

(51) Int. Cl.
*H03K 19/00* (2006.01)
*H01L 25/00* (2006.01)
(Continued)

(52) U.S. Cl.
CPC ............ *G06F 30/333* (2020.01); *H01L 25/00* (2013.01); *H03K 19/00* (2013.01); *G01R 11/00* (2013.01);
(Continued)

(58) Field of Classification Search
CPC .. G06F 30/333; G06F 30/3308; G06F 30/398; G06F 2111/12; G01R 31/08;
(Continued)

(56) References Cited

U.S. PATENT DOCUMENTS 7,657,809 B1 * 2/2010 Bhatia ............ G01R 31/318563
714/729
7,734,975 B2 6/2010 Anzou et al.
(Continued)

FOREIGN PATENT DOCUMENTS

JP 2004-233084 A 8/2004
JP 2004-309174 A 11/2004
(Continued)

*Primary Examiner* — Phallaka Kik
(74) *Attorney, Agent, or Firm* — Allen & Overy LLP

(57) ABSTRACT

According to one embodiment, a semiconductor integrated circuit includes: a logic circuit including a first scan chain configured to operate based on a first clock signal and a second scan chain configured to operate based on a second clock signal in a built-in self-test; a pattern generator configured to generate a test pattern and transmit the test pattern to the first and second scan chains; a compression circuit configured to compress first data received from the first and second scan chains; a clock select circuit configured to select one of the first and second clock signals and transmit the one of the first and second clock signals to the corresponding one of the first and second scan chains in the test; and a test control circuit configured to control the test and detect a fault in the logic circuit based on a result of the test.

8 Claims, 13 Drawing Sheets

(51) Int. Cl.
  *G01R 31/08* (2020.01)
  *G01R 31/3187* (2006.01)
  *G01R 31/28* (2006.01)
  *G01R 31/14* (2006.01)
  *G01R 11/00* (2006.01)
  *G01R 27/28* (2006.01)
  *G06F 30/333* (2020.01)
  *G06F 30/3308* (2020.01)
  *G06F 30/398* (2020.01)
  *G06F 111/12* (2020.01)

(52) U.S. Cl.
  CPC ............. *G01R 27/28* (2013.01); *G01R 31/08* (2013.01); *G01R 31/14* (2013.01); *G01R 31/28* (2013.01); *G01R 31/3187* (2013.01); *G06F 2111/12* (2020.01)

(58) Field of Classification Search
  CPC .... G01R 31/3187; G01R 31/28; G01R 31/00; G01R 31/14; G01R 11/00; G01R 27/28; H03K 19/00; H01L 25/00
  USPC ............ 716/108, 111, 136; 703/16; 702/118, 702/120; 714/733, 734, 731, 732, 738; 324/527, 750.3; 326/16, 41, 47, 101
  See application file for complete search history.

(56) References Cited

U.S. PATENT DOCUMENTS

| | | | | |
|---|---|---|---|---|
| 2004/0139377 A1* | 7/2004 | Barnhart | ......... | G01R 31/31926 714/726 |
| 2004/0148554 A1* | 7/2004 | Dervisoglu | .... | G01R 31/318385 714/727 |
| 2004/0187058 A1 | 9/2004 | Yamada et al. | | |
| 2005/0028060 A1* | 2/2005 | Dervisoglu | .... | G01R 31/318572 714/726 |
| 2005/0055617 A1* | 3/2005 | Wang | ............. | G01R 31/318547 714/727 |
| 2007/0011542 A1* | 1/2007 | Mukherjee | ..... | G01R 31/318541 714/738 |
| 2008/0023700 A1* | 1/2008 | Gschwind | ...... | G01R 31/318569 257/48 |
| 2008/0195346 A1* | 8/2008 | Lin | ................ | G01R 31/318575 702/119 |
| 2008/0256497 A1* | 10/2008 | Wohl | ...................... | H03M 7/30 716/103 |
| 2009/0106613 A1* | 4/2009 | Goyal | ........... | G01R 31/318547 714/729 |
| 2009/0125770 A1* | 5/2009 | Parulkar | ........ | G01R 31/318533 714/731 |
| 2011/0167310 A1* | 7/2011 | Tung | ............. | G01R 31/318538 714/731 |
| 2011/0307750 A1* | 12/2011 | Narayanan | ......... | G01R 31/3177 714/729 |
| 2012/0072879 A1* | 3/2012 | Gizdarski | ...... | G01R 31/318335 716/112 |
| 2012/0209556 A1* | 8/2012 | Rajski | ........... | G01R 31/318575 702/108 |
| 2012/0226953 A1* | 9/2012 | Nakazato | ................ | G06F 11/27 714/726 |
| 2012/0324303 A1* | 12/2012 | Tekumalla | ..... | G01R 31/318572 714/729 |
| 2013/0103994 A1* | 4/2013 | Tekumalla | ..... | G01R 31/318558 714/726 |
| 2013/0111286 A1* | 5/2013 | Tekumalla | ..... | G01R 31/318594 714/726 |
| 2014/0289576 A1 | 9/2014 | Maekawa | | |
| 2016/0266201 A1* | 9/2016 | Waayers | ........ | G01R 31/318594 |
| 2016/0349318 A1* | 12/2016 | Pereira | ........ | G01R 31/318552 |
| 2019/0011500 A1* | 1/2019 | Shah | ................ | G01R 31/31727 |
| 2019/0267973 A1* | 8/2019 | Nakako | ......... | G01R 31/318555 |

FOREIGN PATENT DOCUMENTS

| | | |
|---|---|---|
| JP | 2007-057423 A | 3/2007 |
| JP | 2007-240414 A | 9/2007 |
| JP | 2010-038874 A | 2/2010 |
| JP | 2014-185981 A | 10/2014 |

\* cited by examiner

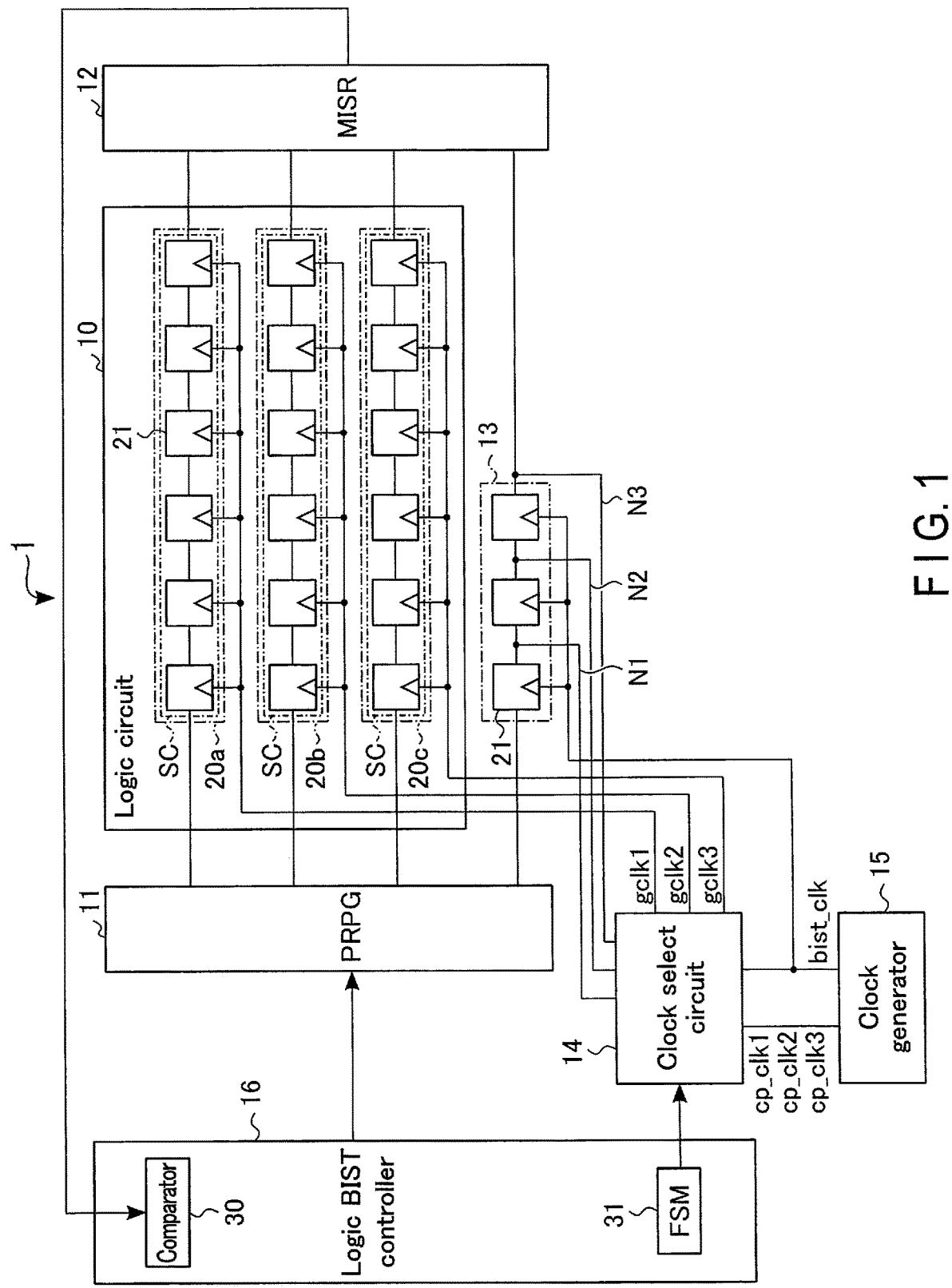
F I G. 1

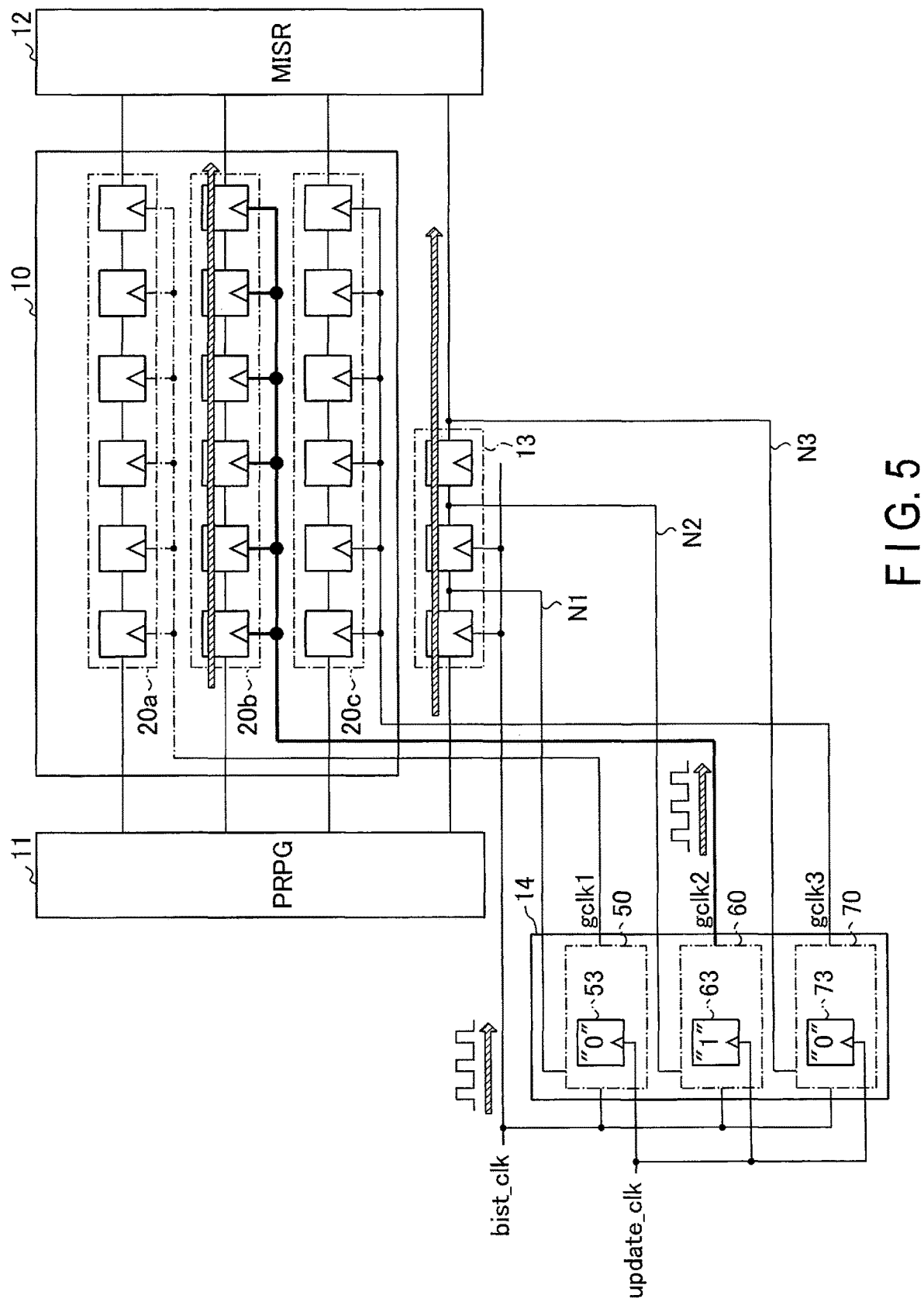
F I G. 5

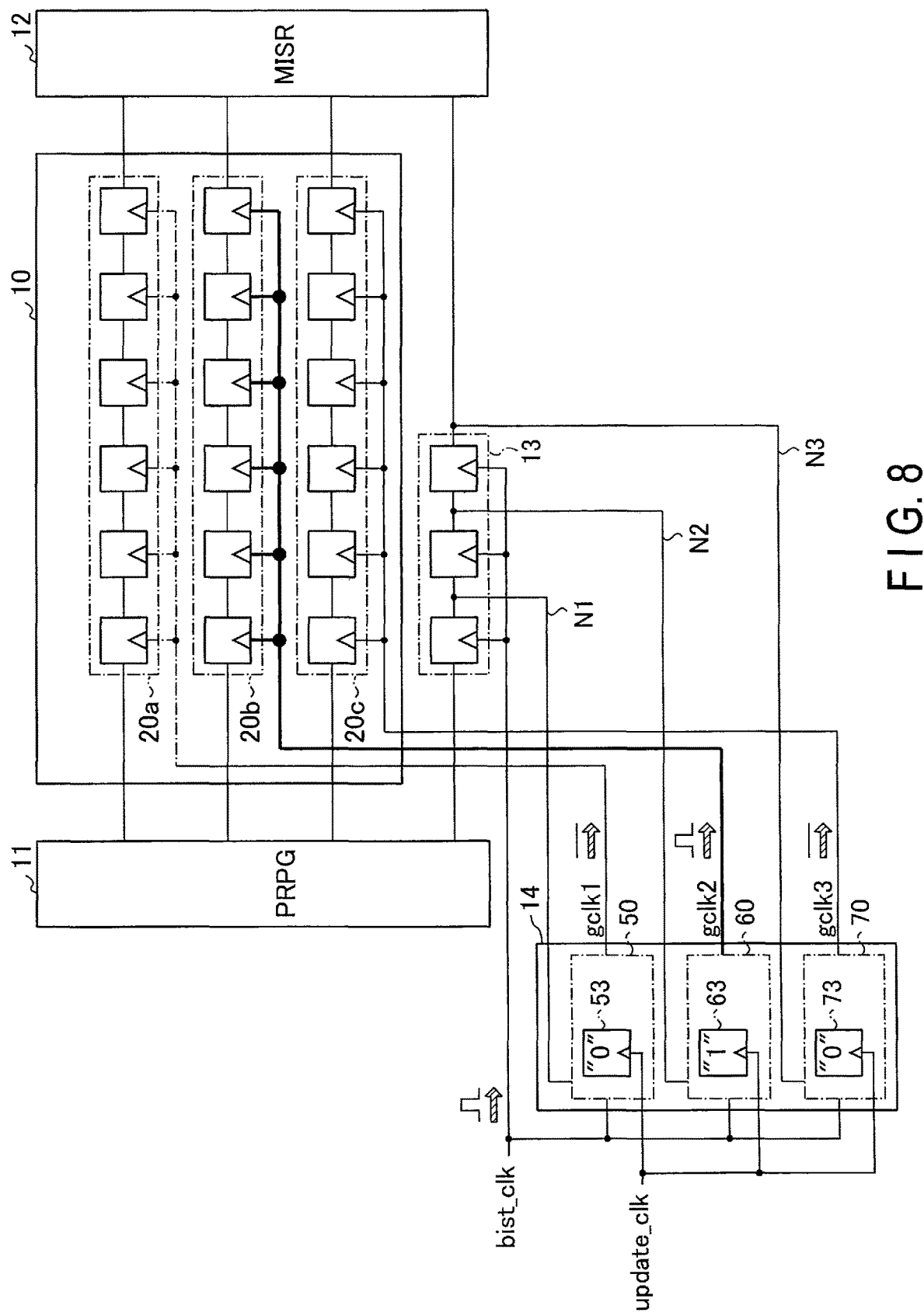
F I G. 8

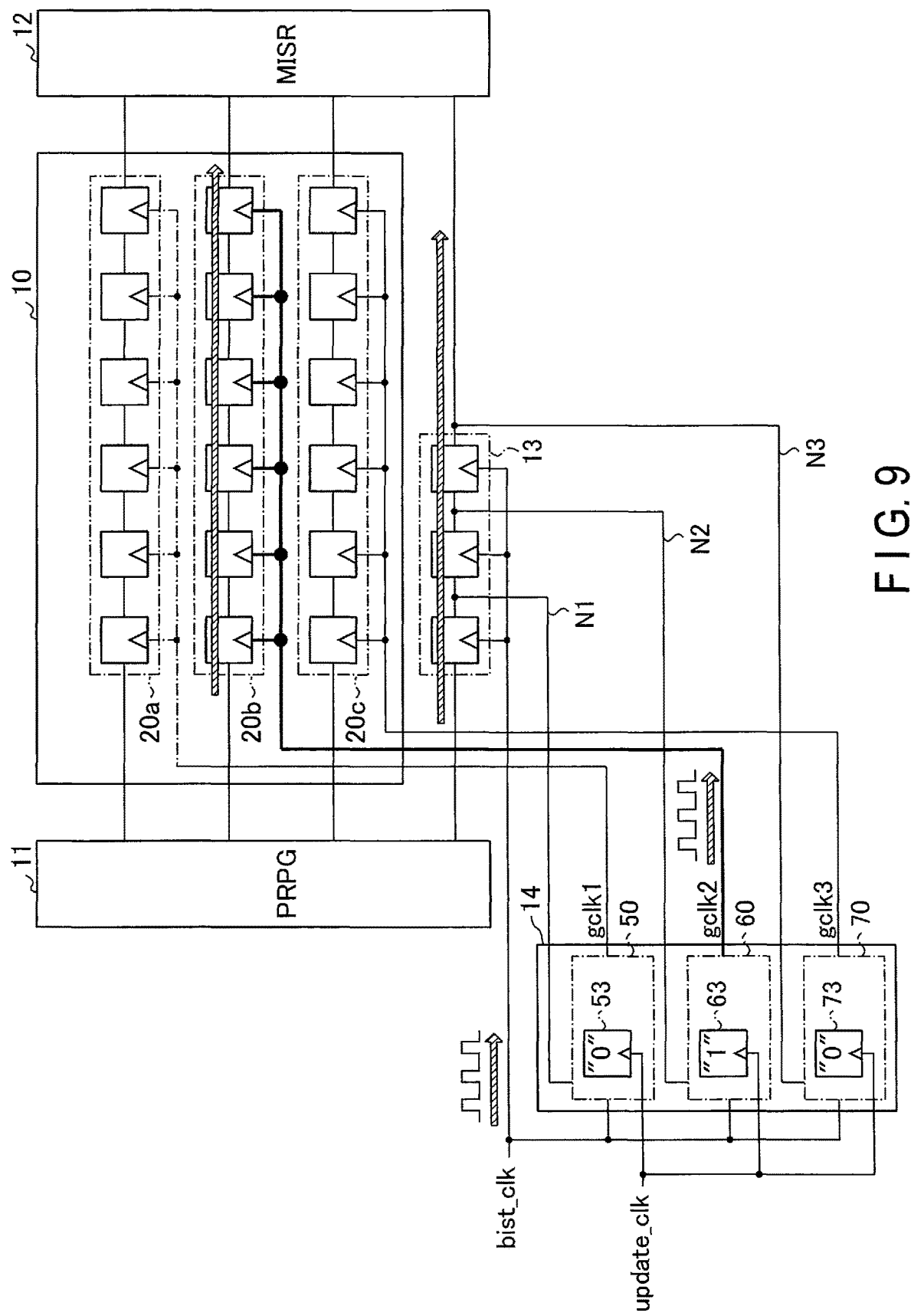
F I G. 9

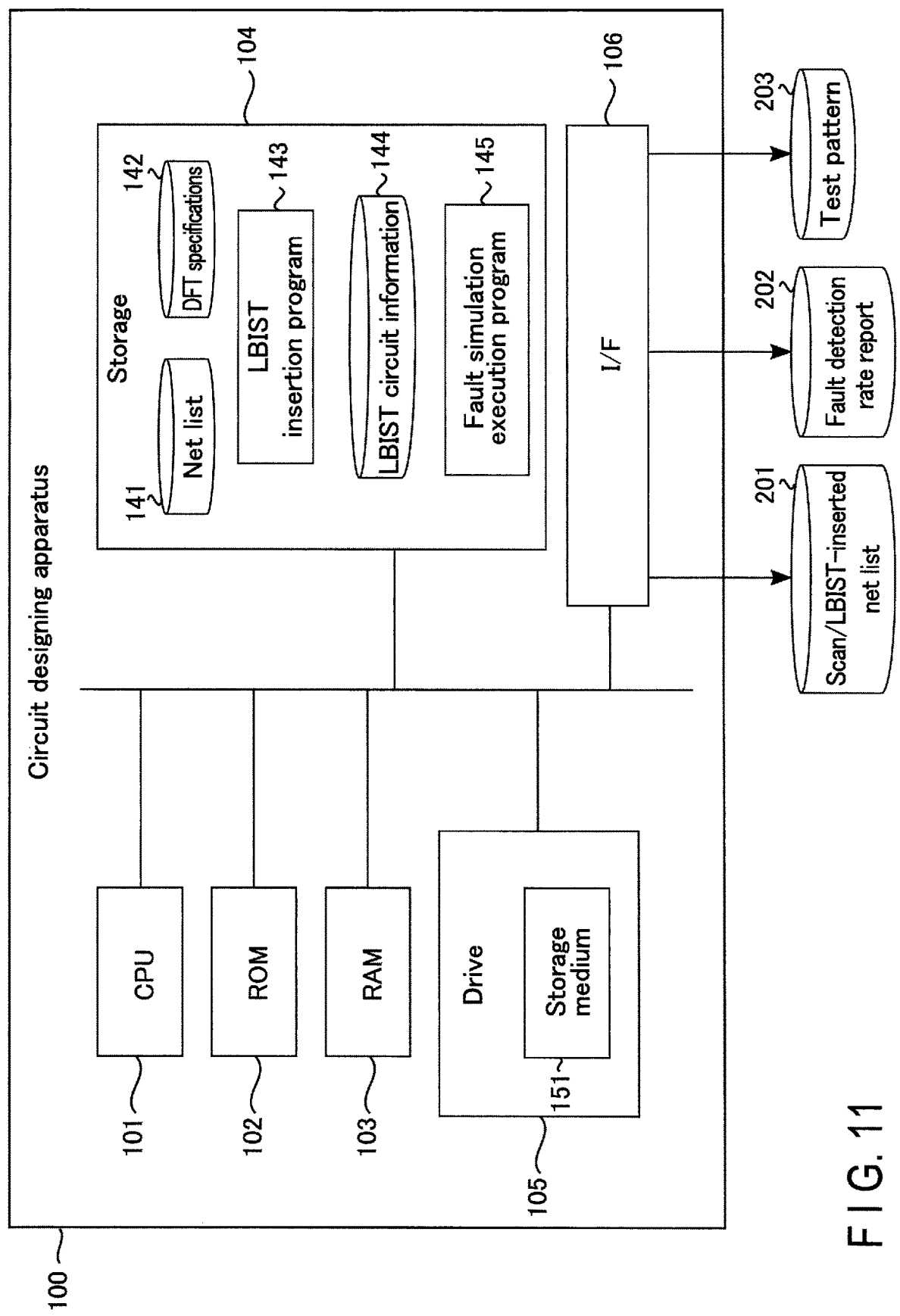
F I G. 11

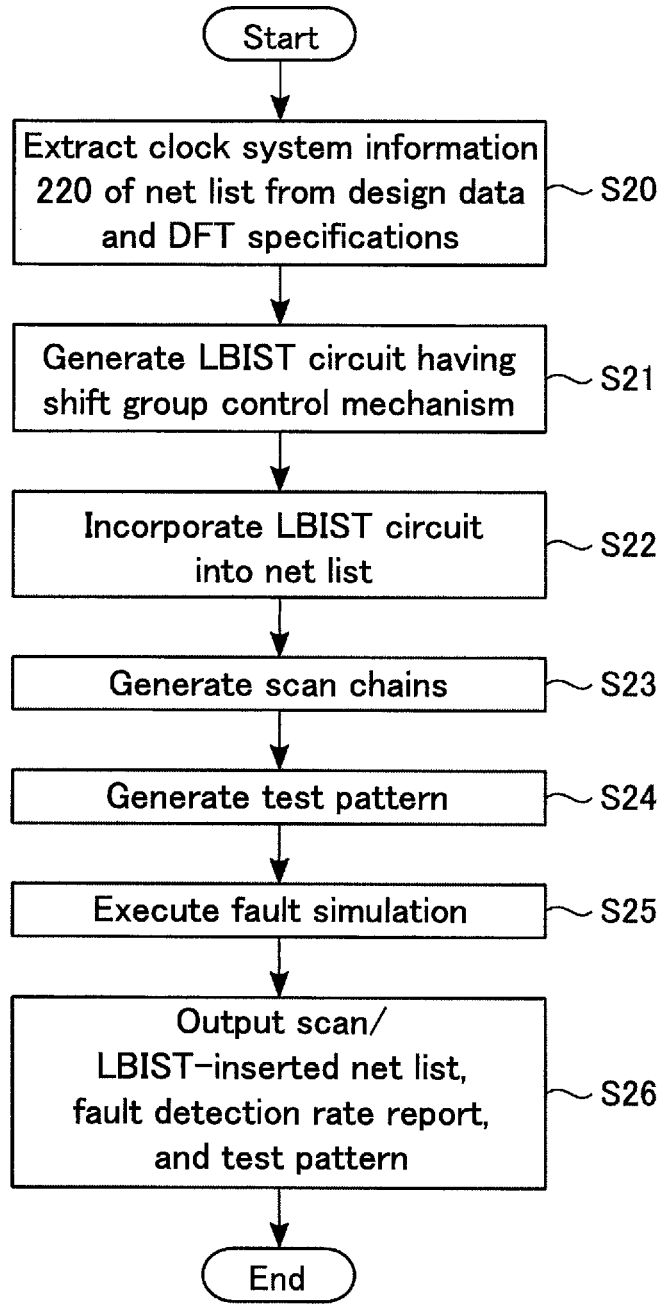
F I G. 13

US 11,397,841 B2

SEMICONDUCTOR INTEGRATED CIRCUIT, CIRCUIT DESIGNING APPARATUS, AND CIRCUIT DESIGNING METHOD

CROSS-REFERENCE TO RELATED APPLICATIONS

This application is based upon and claims the benefit of priority from Japanese Patent Application No. 2020-037554, filed Mar. 5, 2020, the entire contents of which are incorporated herein by reference.

FIELD

Embodiments described herein relate generally to a semiconductor integrated circuit, as well as a circuit designing apparatus and circuit designing method for designing the circuit.

BACKGROUND

Semiconductor integrated circuits include those provided with a function of a built-in self-test (BIST).

BRIEF DESCRIPTION OF THE DRAWINGS

FIG. 1 is a block diagram of a semiconductor integrated circuit according to a first embodiment.

FIGS. 4 to 9 are diagrams showing a state of the semiconductor integrated circuit according to the first embodiment during the LBIST.

FIG. 11 is a block diagram showing the hardware structure of a circuit designing apparatus according to the second embodiment.

FIG. 13 is a flowchart of circuit designing on the circuit designing apparatus according to the second embodiment.

DETAILED DESCRIPTION

Figure 2:
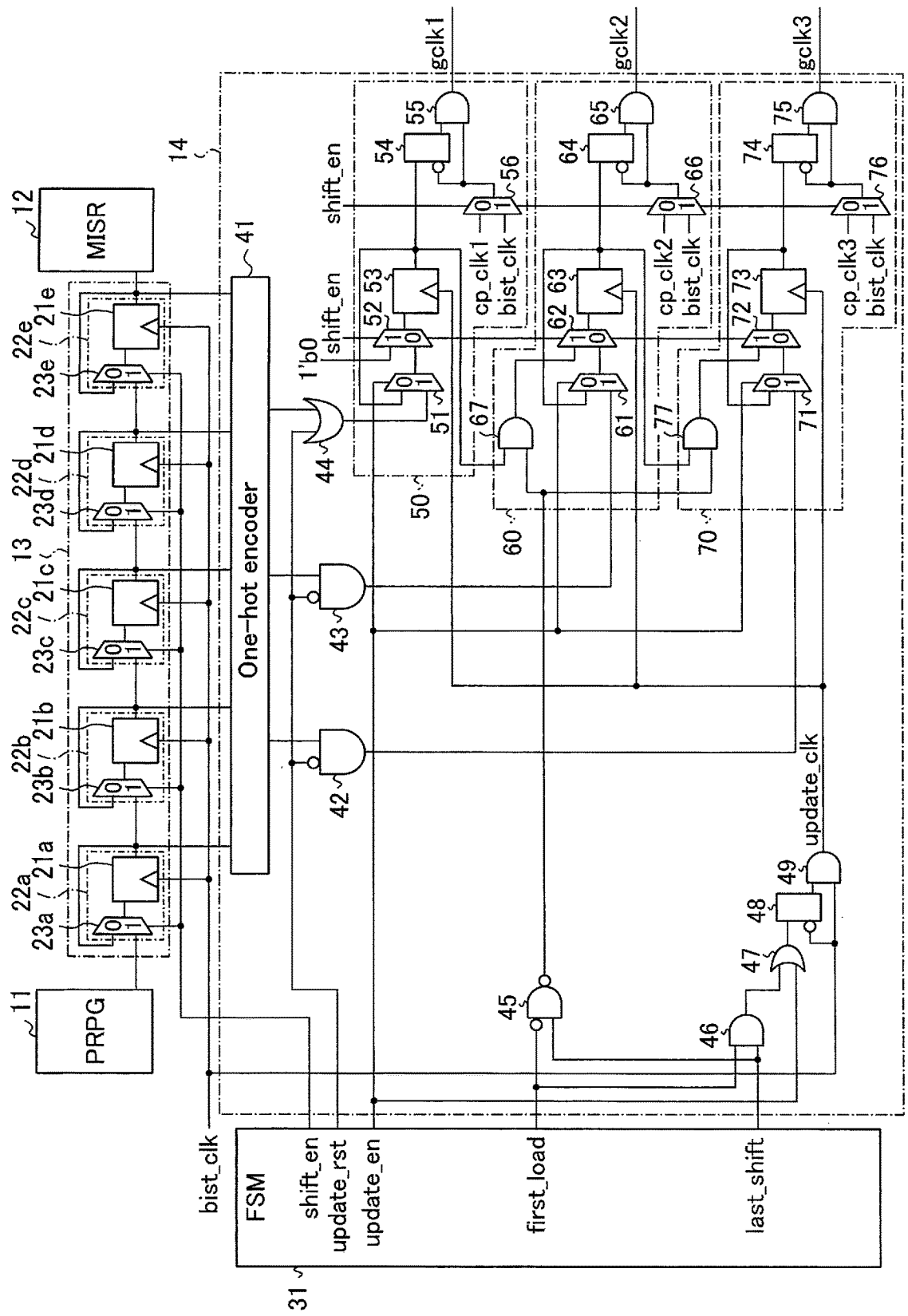
FIG. 2 is a circuit diagram of a clock select circuit in the semiconductor integrated circuit according to the first embodiment.

In general, according to one embodiment, a semiconductor integrated circuit includes: a logic circuit including a first scan chain configured to operate based on a first clock signal and a second scan chain configured to operate based on a second clock signal different from the first clock signal in a built-in self-test; a pattern generator configured to generate a test pattern and transmit the test pattern to the first and second scan chains; a compression circuit configured to compress first data received from the first and second scan chains; a clock select circuit configured to select one of the first and second clock signals and transmit the one of the first and second clock signals to the corresponding one of the first and second scan chains in the test; and a test control circuit configured to control the test and detect a fault in the logic circuit based on a result of the test.

The embodiments will be explained below with reference to the drawings. Throughout the explanation, the same reference numerals are assigned to structural components having the same functions and configurations.

1. First Embodiment

The semiconductor integrated circuit according to the first embodiment will be explained.

1.1. Structure

1.1.1. Structure of Semiconductor Integrated Circuit

First, an exemplary structure of the semiconductor integrated circuit will be explained with reference to FIG. 1. A block diagram of the semiconductor integrated circuit according to the present embodiment is presented in FIG. 1. The example of FIG. 1 represents an overview of the structure when a logic built-in self-test (LBIST) is executed.

The semiconductor integrated circuit according to the present embodiment executes a built-in self-test of a logic circuit (hereinafter may be referred to as the "LBIST", or simply as the "test") in the semiconductor integrated circuit, for example, in response to an instruction from an external device, at startup of the apparatus, or at regular intervals, to detect a fault therein. During the LBIST, a fault in the logic circuit is detected using a test circuit pattern (hereinafter may be referred to as a "scan chain") that has been built into the logic circuit.

The test mainly includes a shift-in operation, a capture operation and a shift-out operation. In the shift-in operation, a test pattern (test data) is input into a scan chain having a plurality of scan flip-flops (hereinafter may be referred to as "scan FFs") serially coupled to each other. A scan FF is a flip-flop having a data input terminal coupled to a multiplexer. In the capture operation, calculation processing is executed in a combination circuit (not shown in the drawings) coupled to the scan FFs of the scan chain, based on the values that have been set to the scan FFs in the shift-in operation, and the results of the calculation processing are taken into the scan FFs. In the shift-out operation, the processing results taken into the scan FFs are output. During the test, the second and subsequent shift-in operations are executed at the same time as the shift-out operation. When a shift-in operation does not need to be distinguished from a shift-out operation, the operation will simply be referred to as a "scan shift operation".

For example, the semiconductor integrated circuit includes a plurality of logic circuits (logic blocks). If this is the case, the semiconductor integrated circuit may execute a test on a currently unused logic block (test target block) in parallel to the ordinary processing. The logic circuits may be included in, for example, the central processing unit (CPU).

As illustrated in FIG. 1, a semiconductor integrated circuit 1 includes a logic circuit 10, a pseudo random pattern generator (PRPG) 11, a multiple input signature register (MISR) 12, a clock chain 13, a clock select circuit 14, clock generator 15 and a logic BIST controller 16.

For example, the logic circuit 10 executes various types of calculation processing to execute tasks. Shift groups 20 (20a, 20b, 20c) are arranged in the logic circuit 10 to operate individually based on different clock signals gclk (gclk1 to gclk3) during the test. In other words, the scan shift operation and capture operation in each shift group 20 are controlled by a corresponding clock signal gclk. In each of the shift groups 20, a plurality of scan chains SC each having an input coupled to the PRPG 11 and an output coupled to the MISR 12 are provided. That is, the scan chains SC are grouped in accordance with the corresponding clock signal gclk. In the example of FIG. 1, for the sake of simplicity, each of the three shift groups 20a to 20c includes a single scan chain SC. The multiplexer coupled to the data input terminal of each of the flip-flops 21 is omitted from the drawings.

Each scan chain SC contains serially coupled flip-flops 21 (six flip-flops 21 in the example of FIG. 1). That is, a scan chain SC may be regarded as a shift register in which a plurality of flip-flops 21 are serially coupled to each other.

The clock signal gclk1 is input to the clock input terminal of each flip-flop 21 in the shift group 20a. The clock signal gclk2 is input to the clock input terminal of each flip-flop 21 in the shift group 20b. The clock signal gclk3 is input to the clock input terminal of each flip-flop 21 in the shift group 20c.

The number of shift groups 20 in the logic circuit 10, the number of scan chains SC in a shift group 20, and the number of flip-flops 21 in a scan chain SC can be freely determined. It is preferable, however, that all the scan chains SC include the same number of flip-flops 21.

The semiconductor integrated circuit 1 according to the present embodiment executes a test while sequentially selecting one of the shift groups 20. In other words, the semiconductor integrated circuit 1 has a mechanism for controlling the shift groups 20 (hereinafter may be referred to as a "shift group control mechanism") in the LBIST. The shift group control mechanism includes a clock chain 13, a clock select circuit 14 and a logic BIST controller 16, which will be described later.

For example, the scan chain SC (flip-flops 21) in the shift group 20a is tested based on the clock signal gclk1. More specifically, the clock signal gclk1 is input into the clock input terminals of the flip-flops 21 in the shift group 20a. For example, in these flip-flops 21, data is set (stored) in agreement with the timing of the clock signal gclk1 rising from the low ("L") level to the high ("H") level. In a similar manner, the scan chain SC in the shift group 20b is tested in accordance with the clock signal gclk2, and the scan chain SC in the shift group 20c is tested in accordance with the clock signal gclk3.

During the test, the PRPG 11 pseudo-randomly generates a test pattern, based on the initial data provided by the logic BIST controller 16. The PRPG 11 transmits the generated test pattern to each of the scan chains SC. For example, the PRPG 11 generates a 6-bit test pattern, for a scan chain SC having six flip-flops 21 serially coupled to each other. The generated test pattern is sequentially input to the six flip-flops 21.

The MISR 12 performs a compression operation on the data received from the scan chain SC during the test. The MISR 12 transmits the compressed data (signature) to the logic BIST controller 16.

During the test, the clock chain 13 transmits a signal based on the test pattern input from the PRPG 11, to the clock select circuit 14. The clock chain 13 has a chain structure similar to that of the scan chain SC, and includes serially coupled flip-flops 21. The input of the clock chain 13 is coupled to the PRPG 11, while its output is coupled to the MISR 12. A clock signal bist_clk received from the clock generator 15 is input to the clock input terminals of the flip-flops 21 in the clock chain 13. Based on the clock signal bist_clk, the data is set in the flip-flops 21. In the example of FIG. 1, the clock chain 13 includes three flip-flops 21. The data output from the three flip-flops 21 is transmitted to the clock select circuit 14 by way of the corresponding nodes N1 to N3. The number of flip-flops 21 in the clock chain 13 may not be the same as the number of flip-flops 21 in a scan chain SC of the shift group 20. The clock chain 13 may be provided in the logic circuit 10.

The clock select circuit 14 selects one of the clock signals gclk1 to gclk3 and transmits it to the corresponding shift group 20 of the logic circuit 10. That is, the clock select circuit 14 functions as clock gating for the clock signals gclk1 to gclk3. More specifically, the clock select circuit 14 selects one of the clock signals gclk1 to gclk3 during the test, based on the various control signals received from the logic BIST controller 16, various clock signals (including the clock signal bist_clk) received from the clock generator 15, data received from the clock chain 13, etc. The clock select circuit 14 transmits, as a clock signal (gclk1 to gclk3), one of the clock signals bist_clk, cp_clk1, cp_clk2 and cp_clk3 received from the clock generator 15, to the corresponding shift group 20.

More specifically, for example, when the scan shift operation is executed in the shift group 20a, the clock select circuit 14 transmits the clock signal bist_clk as a clock signal gclk1 to the shift group 20a. When the capture operation is executed in the shift group 20a, the clock select circuit 14 transmits the clock signal cp_clk1 as a clock signal gclk1 to the shift group 20a. Ina similar manner, for example, when the scan shift operation is executed in the shift group 20b, the clock select circuit 14 transmits the clock signal bist_clk as a clock signal gclk2 to the shift group 20b. When the capture operation is executed in the shift group 20b, the clock select circuit 14 transmits the clock signal cp_clk2 as a clock signal gclk2 to the shift group 20b. For example, when the scan shift operation is executed in the shift group 20c, the clock select circuit 14 transmits the clock signal bist_clk as a clock signal gclk3 to the shift group 20c. When the capture operation is executed in the shift group 20c, the clock select circuit 14 transmits the clock signal cp_clk3 as a clock signal gclk3 to the shift group 20c. The clock select circuit 14 will be described in detail later.

The clock generator 15 includes, for example, a phase locked loop (PLL), on-chip clock controller (OCC), etc. which are not shown in the drawings, and generates various clock signals for use in the semiconductor integrated circuit 1. For example, the clock generator 15 generates clock signals bist_clk, cp_clk1, cp_clk2, and cp_clk3 for use in the test. For example, the clock signal bist_clk is used in the scan shift operation. The clock signals cp_clk1, cp_clk2, and cp_clk3 are used in the capture operation of the corresponding shift groups 20a, 20b, and 20c. The clock signals bist_clk, cp_clk1, cp_clk2, and cp_clk3 may have different frequencies.

In the test, the clock generator 15 transmits the generated clock signal to the clock chain 13, clock select circuit 14, logic BIST controller 16, etc.

In the test, the logic BIST controller 16 controls the logic circuit 10, PRPG 11, MISR 12, clock chain 13, clock select circuit 14, and clock generator 15.

The logic BIST controller 16 includes a comparator 30 and a finite state machine 31 (FSM).

The comparator 30 compares the data received from the MISR 12 with a value expected from the initial data transmitted to the PRPG 11 (value obtained when the test results are normal). Based on the result of the comparator 30, the logic BIST controller 16 determines whether or not the test has been completed normally, or in other words whether or not the logic circuit 10 is faulty. For example, the logic BIST controller 16 outputs the result of the fault determination, for example, to an external device.

The FSM 31 transmits a control signal corresponding to the state of the test to the clock select circuit 14. The states and control signals will be described in detail later.

1.1.2. Structures of Clock Chain and Clock Select Circuit

Next, exemplary structures of the clock chain 13 and clock select circuit 14 will be explained with reference to FIG. 2. FIG. 2 is a circuit diagram of the clock chain 13 and clock select circuit 14. In the example of FIG. 2, the clock chain 13 includes five flip-flops 21. Furthermore, this example shows an overall structure when the LBIST is executed.

As illustrated in FIG. 2, for example, the clock chain 13 includes five scan FFs 22 (22a to 22e).

The scan FFs 22a to 22e are serially coupled. The input of the scan FF 22a is coupled to the PRPG 11, and the output of the scan FF 22e is coupled to the MISR 12.

Each of the scan FFs 22 includes a flip-flop 21 and a multiplexer 23. This means that the clock chain 13 includes five flip-flops 21 (21a to 21e) and five multiplexers 23 (23a to 23e).

In the following explanation, the input terminal selected when the control signal of the multiplexer indicates the data "1" will be referred to as "input terminal ("1")", and the input terminal selected when the control signal indicates the data "0" will be referred to as "input terminal ("0")".

The input terminal ("1") of the multiplexer 23a of the scan FF 22a is coupled to the output terminal of the PRPG 11, and the input terminal ("0") of the multiplexer 23a is coupled to the output terminal of the flip-flop 21a in the same scan FF 22a. The output terminal of the multiplexer 23a is coupled to the input terminal of the flip-flop 21a. A shift_enable signal shift_en, which is received from the FSM 31 in the logic BIST controller 16, is input to the control signal input terminal of the multiplexer 23a. The shift_enable signal shift_en is set to the "H" level (data "1") when the scan shift operation is executed. In other words, when the shift_enable signal shift_en is at the "H" level, the flip-flop 21 is in a state of being capable of capturing a test pattern. For example, when the shift enable signal shift_en is at the "H" level (data "1"), the multiplexer 23a selects the input terminal ("1") and outputs the data (test pattern) received from the PRPG 11. When the shift enable signal shift_en is at the "L" level (data "0"), the multiplexer 23a selects the input terminal ("0"), and outputs the output data of the flip-flop 21a. That is, the output data of the flip-flop 21a is maintained regardless of the clock signal bist_clk input to the flip-flop 21a.

The clock signal bist_clk received from the clock generator 15 is input to the clock input terminal of the flip-flop 21a. The output terminal of the flip-flop 21a is coupled to the input terminal ("0") of the multiplexer 23a, input terminal ("1") of the multiplexer 23b of the scan FF 22b, and a one-hot encoder 41 arranged in the clock select circuit 14.

The scan FFs 22b to 22e have the same structure as that of the scan FF 22a, but the coupling of the input terminal ("1") of the multiplexers 23 and the coupling of the output terminals of the flip-flops 21 differ from their counterparts in the scan FF 22a. More specifically, the input terminal ("1") of the multiplexer 23b of the scan FF 22b is coupled to the output terminal of the flip-flop 21a of the scan FF 22a. The input terminal ("1") of the multiplexer 23c of the scan FF 22c is coupled to the output terminal of the flip-flop 21b of the scan FF 22b. The input terminal ("1") of the multiplexer 23d of the scan FF 22d is coupled to the output terminal of the flip-flop 21c of the scan FF 22c. The input terminal ("1") of the multiplexer 23e of the scan FF 22e is coupled to the output terminal of the flip-flop 21d of the scan FF 22d. The output terminal of the flip-flop 21e is coupled to the MISR 12.

Next, the clock select circuit 14 will be described.

The clock select circuit 14 includes a one-hot encoder 41, AND circuits 42, 43, 46 and 49, OR circuits 44 and 47, a NAND circuit 45, a latch circuit 48, a gclk-1 generator 50, a gclk-2 generator 60, and a gclk-3 generator 70.

The one-hot encoder 41 encodes, for example, the 5-bit data received from the flip-flops 21a to 21e of the clock chain 13 to generate 3-bit data containing a single "1", namely "001", "010", or "100", and output this data. That is, the one-hot encoder 41 generates 3-bit data, which is one of "001", "010" or "100", based on the pseudo random data generated by the PRPG 11. In the present embodiment, the data "100" corresponds to the clock signal gclk1, the data "010" corresponds to the clock signal gclk2, and the data "001" corresponds to the clock signal gclk3. The number of bits of the data output by the one-hot encoder 41 is not limited to 3 bits, but it corresponds to the number of clock signals gclk (shift groups 20).

An inverted signal of the update reset signal update_rst received from the FSM 31 is input to one of the input terminals of the AND circuit 42, while the upper-bit data of the 3-bit data output by the one-hot encoder 41 is input to the other input terminal. The update reset signal update_rst is set to the "H" level, for example, when the initial value of the later described update register (e.g., data "100") is set at the start of the test. The output terminal of the AND circuit 42 is coupled to the input terminal ("1") of the multiplexer 71 in the gclk-3 generator 70.

The inverted signal of the update reset signal update_rst received from the FSM 31 is input to one of the input terminals of the AND circuit 43, while the middle-bit data of the 3-bit data output by the one-hot encoder 41 is input to the other input terminal. The output terminal of the AND circuit 43 is coupled to the input terminal ("1") of the multiplexer 61 in the gclk-2 generator 60.

The update reset signal update_rst received from the FSM 31 is input to one of the input terminals of the OR circuit 44, while the lower-bit data of the 3-bit data output by the one-hot encoder 41 is input to the other input terminal. The output terminal of the OR circuit 44 is coupled to the input terminal ("1") of the multiplexer 51 in the gclk-1 generator 50.

The inverted signal of the first load signal first_load received from the FSM 31 is input to one of the input terminals of the NAND circuit 45, while a last shift signal last_shift received from the FSM 31 is input to the other input terminal. For example, the first load signal first_load is maintained at the "H" level during the first scan shift operation (shift-in operation) executed by each shift group 20 at the start of the test. In the first scan shift operation, the shift groups 20a to 20c are sequentially selected for the execution of the shift-in operation, regardless of the output data of the one-hot encoder. For example, the last shift signal last_shift is set to the "H" level at the timing of the last scan (shift) in the scan shift operation. The output terminal of the NAND circuit 45 is coupled to one of the input terminals of the AND circuit 67 in the gclk-2 generator 60 and one of the input terminals of the AND circuit 77 in the gclk-3 generator 70.

The first load signal first_load is input to one of the input terminals of the AND circuit 46, while the last shift signal last_shift is input to the other input terminal. The output terminal of the AND circuit 46 is coupled to the one of the input terminals of the OR circuit 47.

The update enable signal update_en received from the FSM 31 is input to the other input terminal of the OR circuit 47. For example, the update enable signal update_en is set to the "H" level when the clock signals gclk1 to gclk3, or in other words the select signals of the shift groups 20a to 20c, are updated. The output terminal of the OR circuit 47 is coupled to the input terminal of the latch circuit 48.

The inverted signal of the clock signal bist_clk is input to the clock input terminal of the latch circuit 48. For example, the latch circuit 48 latches the output data of the OR circuit 47 at the timing of the clock signal bist_clk falling from the "H" level to the "L" level. The output terminal of the latch circuit 48 is coupled to one of the input terminals of the AND circuit 49.

The clock signal bist_clk is input to the other input terminal of the AND circuit 49. The output terminal of the AND circuit 49 is coupled to the clock input terminal of a flip-flop 53 included in the gclk-1 generator 50, the clock input terminal of a flip-flop 63 included in the gclk-2 generator 60, and the clock input terminal of a flip-flop 73 included in the gclk-3 generator 70. That is, the output data (clock signal) of the AND circuit 49 serves as an update clock signal update_clk that controls the timing of updating the data of the flip-flops 53, 63 and 73.

The gclk-1 generator 50 generates a clock signal gclk1. This gclk-1 generator 50 includes multiplexers 51, 52 and 56, a flip-flop 53, a latch circuit 54, and an AND circuit 55.

The input terminal ("1") of the multiplexer 51 is coupled to the output terminal of the OR circuit 44, while its input terminal ("0") is coupled to the output terminal of the flip-flop 53. The output terminal of the multiplexer 51 is coupled to the input terminal ("0") of the multiplexer 52. An update enable signal update_en is input to the control signal input terminal of the multiplexer 51. For example, when the update enable signal update_en is at the "H" level (data "1"), the multiplexer 51 outputs the data received from the OR circuit 44. For example, when the update enable signal update_en is at the "L" level (data "0"), the multiplexer 51 outputs the output data of the flip-flop 53.

The data "0" (1'b0) is input to the input terminal ("1") of the multiplexer 52. The output terminal of the multiplexer 52 is coupled to the input terminal of the flip-flop 53. A shift enable signal shift_en is input to the control signal input terminal of the multiplexer 52. For example, when the shift enable signal shift_en is at the "H" level (data "1"), the multiplexer 52 outputs data "0". When the shift_enable signal shift_en is at the "L" level (data "0"), the multiplexer 52 outputs the output data of the multiplexer 51.

The output terminal of the flip-flop 53 is coupled to the input terminal ("0") of the multiplexer 51, the input terminal of the latch circuit 54, and the other input terminal of the AND circuit 67 in the gclk-2 generator 60.

The inverted data (signal) of the output data (clock signal) of the multiplexer 56 is input to the clock input terminal of the latch circuit 54. The output terminal of the latch circuit 54 is coupled to one of the input terminals of the AND circuit 55.

The other input terminal of the AND circuit 55 is coupled to the output terminal of the multiplexer 56. The clock signal gclk1 is output from the output terminal of the AND circuit 55.

The clock signal cp_clk1 is input to the input terminal ("0") of the multiplexer 56, and the clock signal bist_clk is input to the input terminal ("1"). The shift_enable signal shift_en is input to the control signal input terminal of the multiplexer 56. When the shift_enable signal shift_en is at the "H" level (data "1"), the multiplexer 56 outputs the clock signal bist_clk. For example, when the shift_enable signal shift_en is at the "L" level (data "0"), the multiplexer 56 outputs the clock signal cp_clk1.

The gclk-2 generator 60 generates the clock signal gclk2. The gclk-2 generator 60 includes multiplexers 61, 62 and 66, a flip-flop 63, a latch circuit 64, and AND circuits 65 and 67.

The input terminal ("1") of the multiplexer 61 is coupled to the output terminal of the AND circuit 43, while the input terminal ("0") is coupled to the output terminal of the flip-flop 63. The output terminal of the multiplexer 61 is coupled to the input terminal ("0") of the multiplexer 62. The update enable signal update_en is input to the control signal input terminal of the multiplexer 61. For example, when the update enable signal update_en is at the "H" level (data "1"), the multiplexer 61 outputs the data received from the AND circuit 43. When the update enable signal update_en is at the "L" level (data "0"), the multiplexer 61 outputs the output data of the flip-flop 63.

The input terminal ("1") of the multiplexer 62 is coupled to the output terminal of the AND circuit 67. The output terminal of the multiplexer 62 is coupled to the input terminal of the flip-flop 63. The shift_enable signal shift_en is input to the control signal input terminal of the multiplexer 62. For example, when the shift_enable signal shift_en is at the "H" level (data "1"), the multiplexer 62 outputs the output data of the AND circuit 67. When the shift_enable signal shift_en is at the "L" level (data "0"), the multiplexer 62 outputs the output data of the multiplexer 61.

One of the input terminals of the AND circuit 67 is coupled to the output terminal of the flip-flop 53 of the gclk-1 generator 50, while the other input terminal is coupled to the output terminal of the NAND circuit 45. The output terminal of the AND circuit 67 is coupled to the input terminal ("1") of the multiplexer 62.

The output terminal of the flip-flop 63 is coupled to the input terminal ("0") of the multiplexer 61, the input terminal of the latch circuit 64, and the other input terminal of the AND circuit 77 in the gclk-3 generator 70.

The inverted data (signal) of the output data (clock signal) of the multiplexer 66 is input to the clock input terminal of the latch circuit 64. The output terminal of the latch circuit 64 is coupled to one of the input terminals of the AND circuit 65.

The other input terminal of the AND circuit 65 is coupled to the output terminal of the multiplexer 66. The clock signal gclk2 is output from the output terminal of the AND circuit 65.

The clock signal cp_clk2 is input to the input terminal ("0") of the multiplexer 66, while the clock signal bist_clk is input to the input terminal ("1"). The shift_enable signal shift_en is input to the control signal input terminal of the multiplexer 66. When the shift_enable signal shift_en is at the "H" level (data "1"), For example, the multiplexer 66 outputs the clock signal bist_clk. For example, when the shift_enable signal shift_en is at the "L" level (data "0"), the multiplexer 66 outputs the clock signal cp_clk2.

The gclk-3 generator 70 generates a clock signal gclk3. The gclk-3 generator 70 includes multiplexers 71, 72 and 76, a flip-flop 73, a latch circuit 74, and AND circuits 75 and 77.

The input terminal ("1") of the multiplexer 71 is coupled to the output terminal of the AND circuit 42, while the input terminal ("0") is coupled to the output terminal of the flip-flop 73. The output terminal of the multiplexer 71 is coupled to the input terminal ("0") of the multiplexer 72. The update enable signal update_en is input to the control signal input terminal of the multiplexer 71. For example, when the update enable signal update_en is at the "H" level (data "1"), the multiplexer 71 outputs the data received from AND circuit 42. When the update enable signal update_en is at the "L" level (data "0"), the multiplexer 71 outputs the output data of the flip-flop 73.

The input terminal ("1") of the multiplexer 72 is coupled to the output terminal of the AND circuit 77. The output terminal of the multiplexer 72 is coupled to the input terminal of the flip-flop 73. The shift_enable signal shift_en is input to the control signal input terminal of the multiplexer 72. For example, when the shift_enable signal shift_en is at the "H" level (data "1"), the multiplexer 72 outputs the output data of the AND circuit 77. When the shift_enable signal shift_en is at the "L" level (data "0"), the multiplexer 72 outputs the output data of the multiplexer 71.

One of the input terminals of the AND circuit 77 is coupled to the output terminal of the flip-flop 63 of the gclk-2 generator 60, while the other input terminal is coupled to the output terminal of the NAND circuit 45. The output terminal of the AND circuit 77 is coupled to the input terminal ("1") of the multiplexer 72.

The output terminal of the flip-flop 73 is coupled to the input terminal ("0") of the multiplexer 71 and the input terminal of the latch circuit 74.

The inverted data (signal) of the output data (clock signal) of the multiplexer 76 is input to the clock input terminal of the latch circuit 74. The output terminal of the latch circuit 74 is coupled to one of the input terminals of the AND circuit 75.

The other input terminal of the AND circuit 75 is coupled to the output terminal of the multiplexer 76. The clock signal gclk3 is output from the output terminal of the AND circuit 75.

The clock signal cp_clk3 is input to the input terminal ("0") of the multiplexer 76, while the clock signal bist_clk is input to the input terminal ("1"). The shift_enable signal shift_en is input to the control signal input terminal of the multiplexer 76. For example, when the shift_enable signal shift_en is at the "H" level (data "1"), the multiplexer 76 outputs the clock signal bist_clk. For example, when the shift enable signal shift_en is at the "L" level (data "0"), the multiplexer 76 outputs the clock signal cp_clk3.

In the above structure, the flip-flops 53, 63 and 73, which are serially coupled to each other, function as a shift register. That is, based on the update clock signal update_clk, the data is shifted from the flip-flop 53 to the flip-flop 63 and to the flip-flop 73, in this order. In the following description, the flip-flops 53, 63 and 73 together may be referred to as an "update register". For example, when the flip-flop 53 holds data "1", and the flip-flops 63 and 73 hold data "0", the update register may be described as holding data "100".

For example, when the update reset signal update_rst is at the "H" level, the AND circuits 42 and 43 output data "0", and the OR circuit 44 outputs data "1", regardless of the data output from the one-hot encoder 41. This means that data "100" is output. When the update enable signal update_en is at the "H" level (data "1"), data "1" is input to the input terminal ("0") of the multiplexer 52, and data "0" is input to the input terminals ("0") of the multiplexers 62 and 72. When the shift enable signal shift_en is at the "L" level (data "0"), the multiplexer 52 outputs data "1", while the multiplexers 62 and 72 output data "0". In this state, at the timing of the update clock signal update_clk rising to the "H" level, data "1" is stored in the flip-flop 53, and data "0" is stored in the flip-flops 63 and 73. In other words, data "100" is stored in the update register. As a result, the clock signal gclk1 is selected. Here, because of the shift_enable signal shift_en at the "H" level (data "1"), the clock signal bist_clk is output as a clock signal gclk1 from the clock select circuit 14.

With the shift_enable signal shift_en at the "H" level, data "0" is input to the input terminal ("1") of the multiplexer 52. Furthermore, with the first load signal first_load at the "H" level, the AND circuit 67 inputs the output data (data "1") of the flip-flop 53 to the input terminal of the multiplexer 62. In the same manner, the AND circuit 77 inputs the output data (data "0") of the flip-flop 63 to the input terminal of the multiplexer 72. When the update clock signal update_clk rises to the "H" level in this state, data "010" is input to the update register. As a result, the clock signal gclk2 is selected.

In the same manner, at the next timing of the update clock signal update_clk rising to the "H" level, data "001" is stored in the update register. As a result, the clock signal gclk3 is selected.

In the above manner, when the first load signal first_load is at the "H" level, data "1" is shifted in the order of the flip-flop 53, the flip-flop 63, and the flip-flop 73 at the timing of the update clock signal update_clk rising to the "H" level.

When the update reset signal update_rst and first load signal first_load are at the "L" level, the data will not be shifted among the flip-flops 53, 63 and 73. In this state, the flip-flops 53, 63 and 73 hold the data output from the one-hot encoder 41. One of the clock signals gclk1 to gclk3 is therefore selected based on the data output by the one-hot encoder 41, or in other words, on the pseudo random test pattern generated by the PRPG 11.

According to the present embodiment, one of the clock signals gclk, or in other words, one of the shift groups 20 is selected using the clock select circuit 14 and one-hot encoder 41, but this is not a limitation. For example, the one-hot encoder 41 may be omitted. If this is the case, the clock select circuit 14 obtains 3-bit data corresponding to the three clock signals gclk1 to gclk3 from the clock chain 13, and selects a clock signal gclk based on this 3-bit data. Furthermore, the 3-bit data may contain more than one bit that is "1". In other words, more than one clock signal gclk (shift group 20) may be selected.

1.2. Test 1.2.1. Flow of Test

Next, the flow of the test will be explained with reference to FIG. 3, which shows the flowchart of the test. In the following explanation, variable n (1≤n≤3) is adopted for the numbering of the clock signals gclk for the sake of simplicity. For example, the variable n is held in a counter provided in the logic BIST controller 16, and incremented under the control of the logic BIST controller 16.

Figure 3:
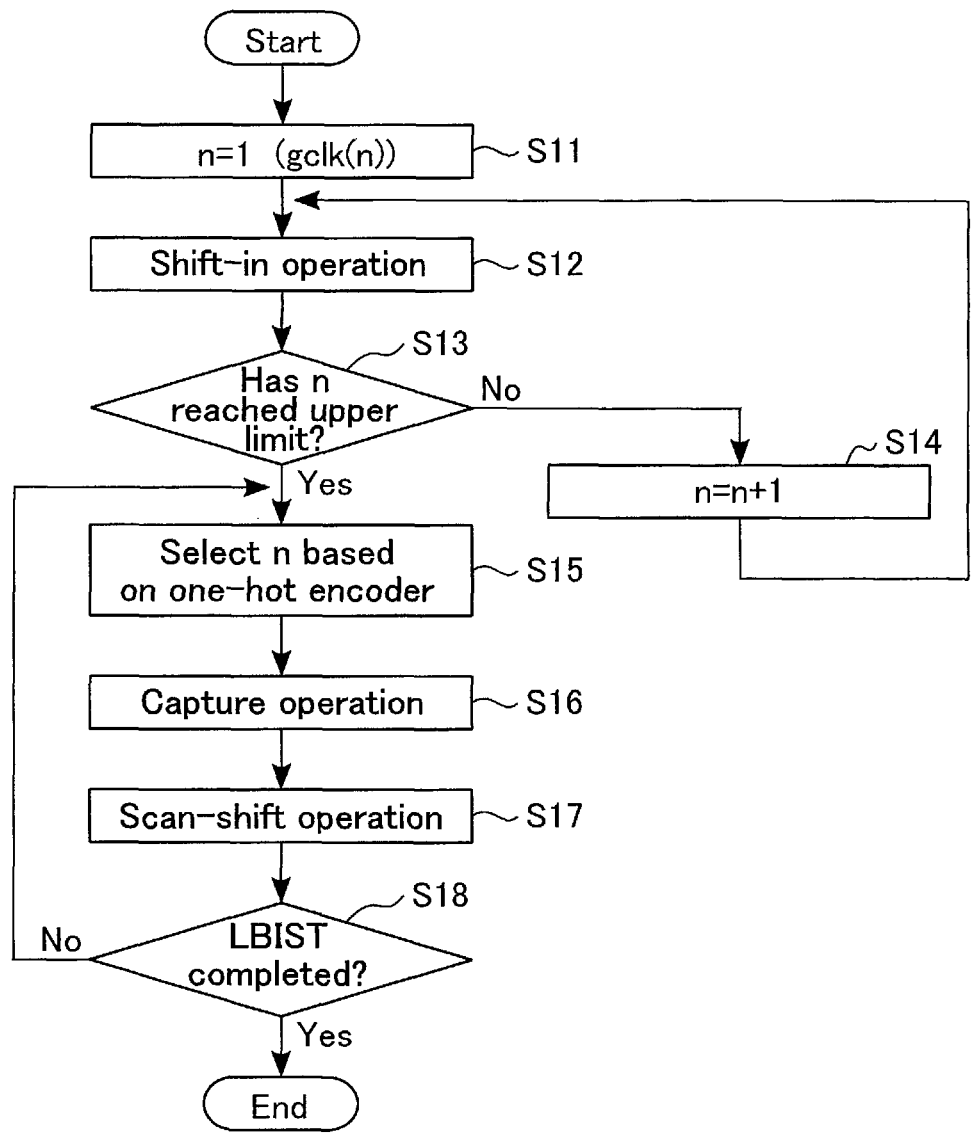
FIG. 3 is a flowchart of the LBIST in the semiconductor integrated circuit according to the first embodiment.

As illustrated in FIG. 3, when the test is started, the logic BIST controller 16 sets n=1 (step S11). That is, the clock select circuit 14 transmits the clock signal gclk1 to the shift group 20a.

In the logic circuit 10, the first shift-in operation (scan shift operation) is executed in the shift group 20 corresponding to the received clock signal gclk(n) (step S12).

After the shift-in operation is completed, it is determined whether or not the variable n has reached the upper limit (n=3 in this example) (step S13).

If the variable n has not yet reached the upper limit ("no" at step S13), or in other words, if the first shift-in operation has not yet been completed for all the shift groups 20, the logic BIST controller 16 sets n=n+1 to increment the variable n (step S14). Thereafter, the logic BIST controller 16 returns to step S12 and repeats the shift-in operation.

If the variable n has reached the upper limit ("yes" at step S13), the logic BIST controller 16 terminates the first shift-in operation in each shift group 20. Next, the logic BIST controller 16 selects a shift group 20 for the execution of the capture operation and scan shift operation. That is, the clock select circuit 14 randomly selects a variable n based on the data output by the one-hot encoder 41 (step S15).

In the logic circuit 10, the capture operation is executed on the shift group 20 corresponding to the clock signal gclk(n) (step S16).

After the capture operation is completed, the scan shift operation is continuously executed on the shift group 20 corresponding to the clock signal gclk(n) (step S17).

If the test (LBIST) has not yet been completed ("no" at step S18), the logic BIST controller 16 returns to step S15 and continues the test.

When the test (LBIST) is completed ("yes" at step S18), the logic BIST controller 16 outputs the result of the fault determination to an external device.

1.2.2. Specific Test Examples

Next, specific examples of the test will be described with reference to FIGS. 4 to 9. FIGS. 4 to 9 show the flow of the clock signals and data during the test. In the examples of FIGS. 4 to 9, the logic circuit 10, PRPG 11, MISR 12, clock chain 13, and clock select circuit 14 are illustrated, while other circuits are omitted for the sake of simplicity. Furthermore, in the structure of the clock select circuit 14, the gclk-1 generator 50, the gclk-2 generator 60, and the gclk-3 generator 70 are illustrated as including only the flip-flop 53, the flip-flop 63, and the flip-flop 73, respectively, and other elements are omitted.

First, the logic BIST controller 16 executes the first scan shift operation (shift-in operation) on the shift group 20a.

Figure 4:
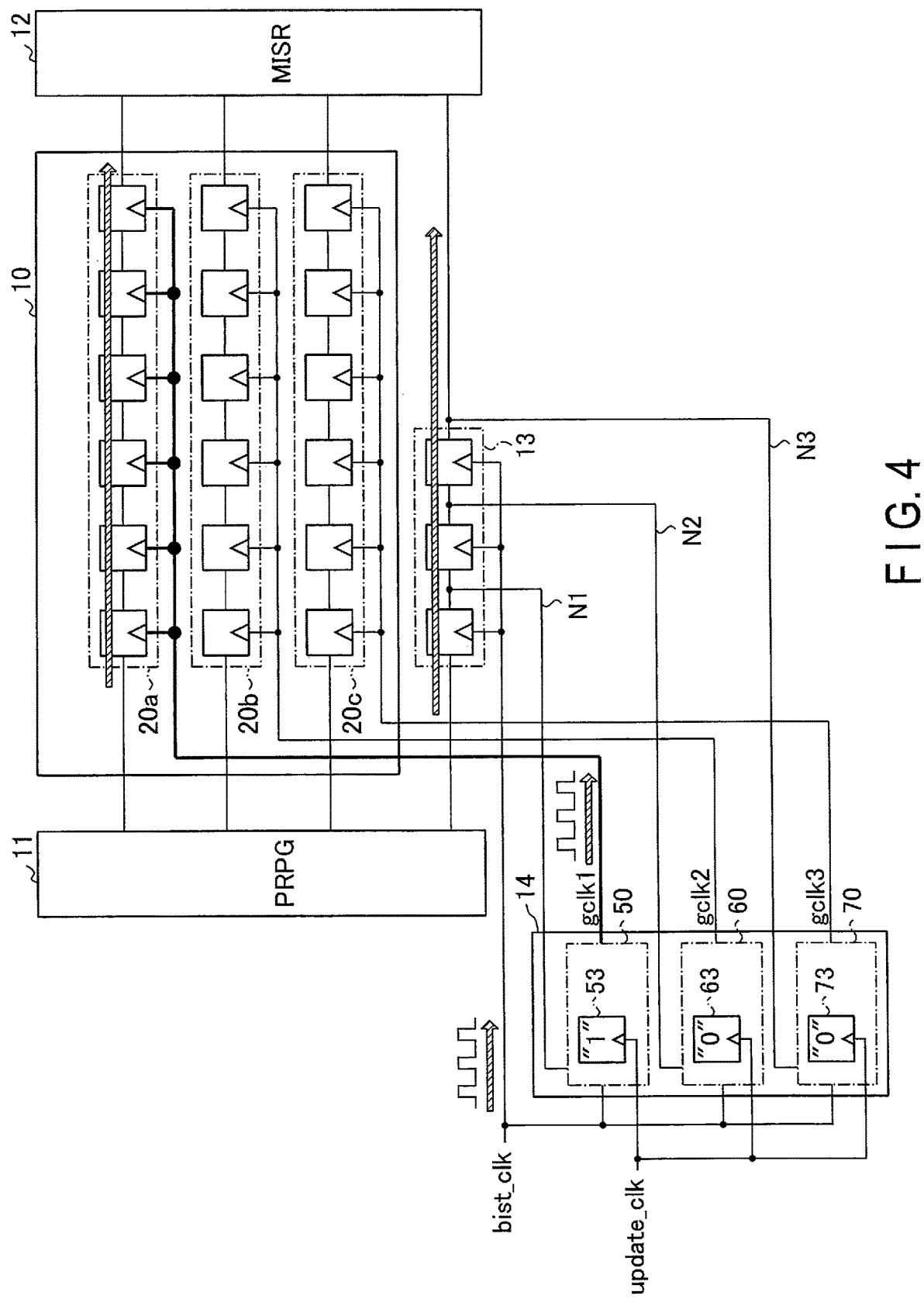

First, as illustrated in FIG. 4, at the timing of the update clock signal update_clk rising to the "H" level, data "1" is stored into the flip-flop 53 of the clock select circuit 14, while data "0" is stored into the flip-flops 63 and 73. That is, data "100" is stored in the update register. In this state, the clock select circuit 14 transmits the clock signal gclk1 (clock signal bist_clk) to the scan chain SC in the shift group 20a. At this timing, the clock signal bist_clk is transmitted from the clock generator 15 to the clock chain 13. In response, the shift-in operation is executed on the shift group 20a and clock chain 13.

Next, the logic BIST controller 16 executes the first scan shift operation (shift-in operation) on the shift group 20b.

As illustrated in FIG. 5, after the shift-in operation is completed in the shift group 20a, the data held in the flip-flops 53, 63 and 73 is updated. More specifically, at the timing of the update clock signal update_clk rising to the "H" level, data "0" is stored into the flip-flops 53 and 73, and data "1" is stored into the flip-flop 63. That is, data "010" is stored in the update register. In this state, the clock select circuit 14 transmits the clock signal gclk2 (clock signal bist_clk) to the scan chain SC in the shift group 20b. Furthermore, at this timing, the clock signal bist_clk is transmitted from the clock generator 15 to the clock chain 13. In response, the shift-in operation is executed on the shift group 20b and clock chain 13.

Next, the logic BIST controller 16 executes the first scan shift operation (shift-in operation) on the shift group 20c.

Figure 6:
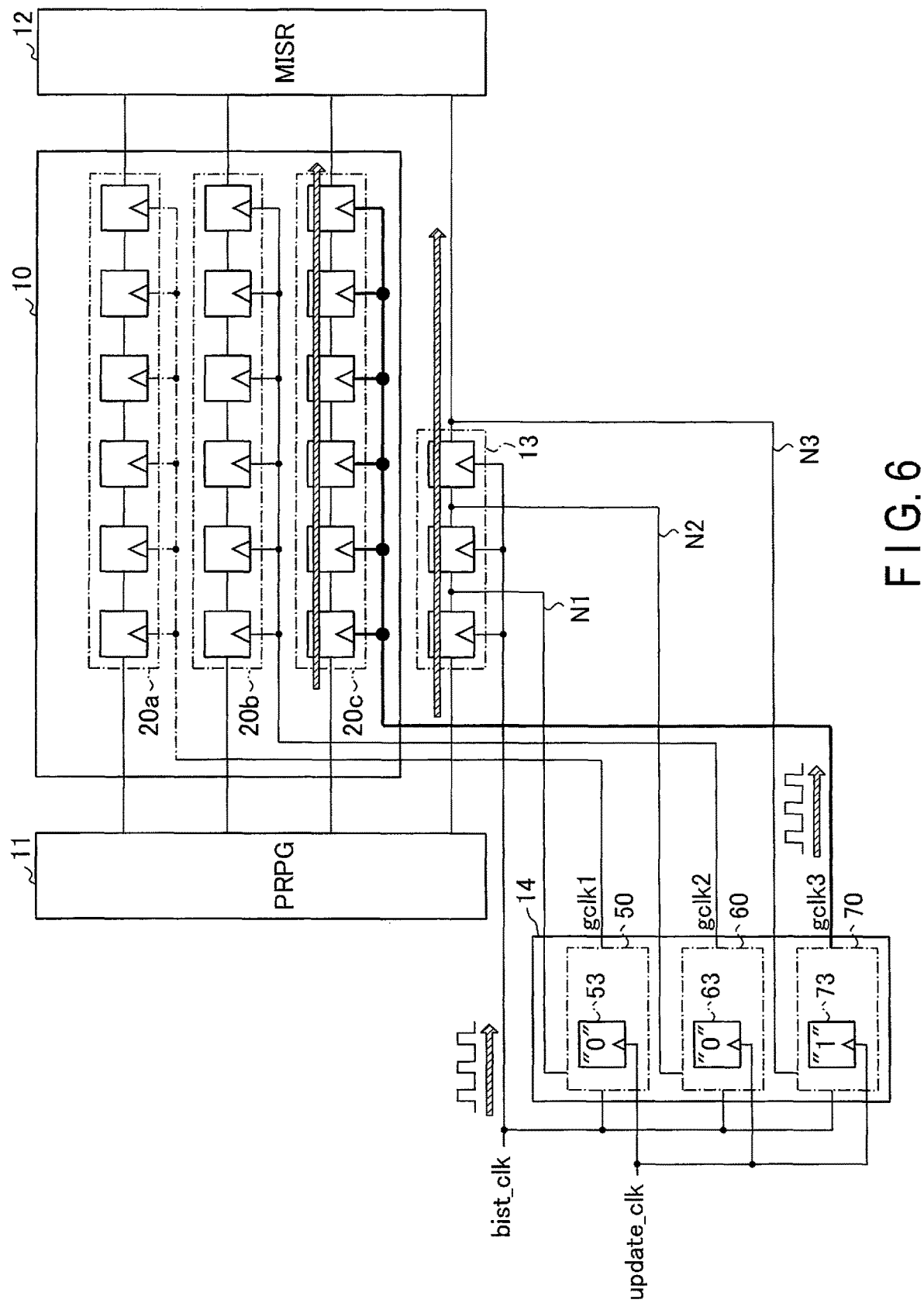

As illustrated in FIG. 6, after the shift-in operation is completed in the shift group 20b, the data held in the flip-flops 53, 63 and 73 is updated. More specifically, at the timing of the update clock signal update_clk rising to the "H" level, data "0" is stored into the flip-flops 53 and 63, and data "1" is stored into the flip-flop 73. That is, data "001" is stored in the update register. In this state, the clock select circuit 14 transmits the clock signal gclk3 (clock signal bist_clk) to the scan chain SC in the shift group 20c. At this timing, the clock signal bist_clk is transmitted from the clock generator 15 to the clock chain 13. In response, the shift-in operation is executed on the shift group 20c and clock chain 13.

Next, the logic BIST controller 16 executes the capture operation and the second scan shift operation on the randomly selected shift group 20.

Figure 7:
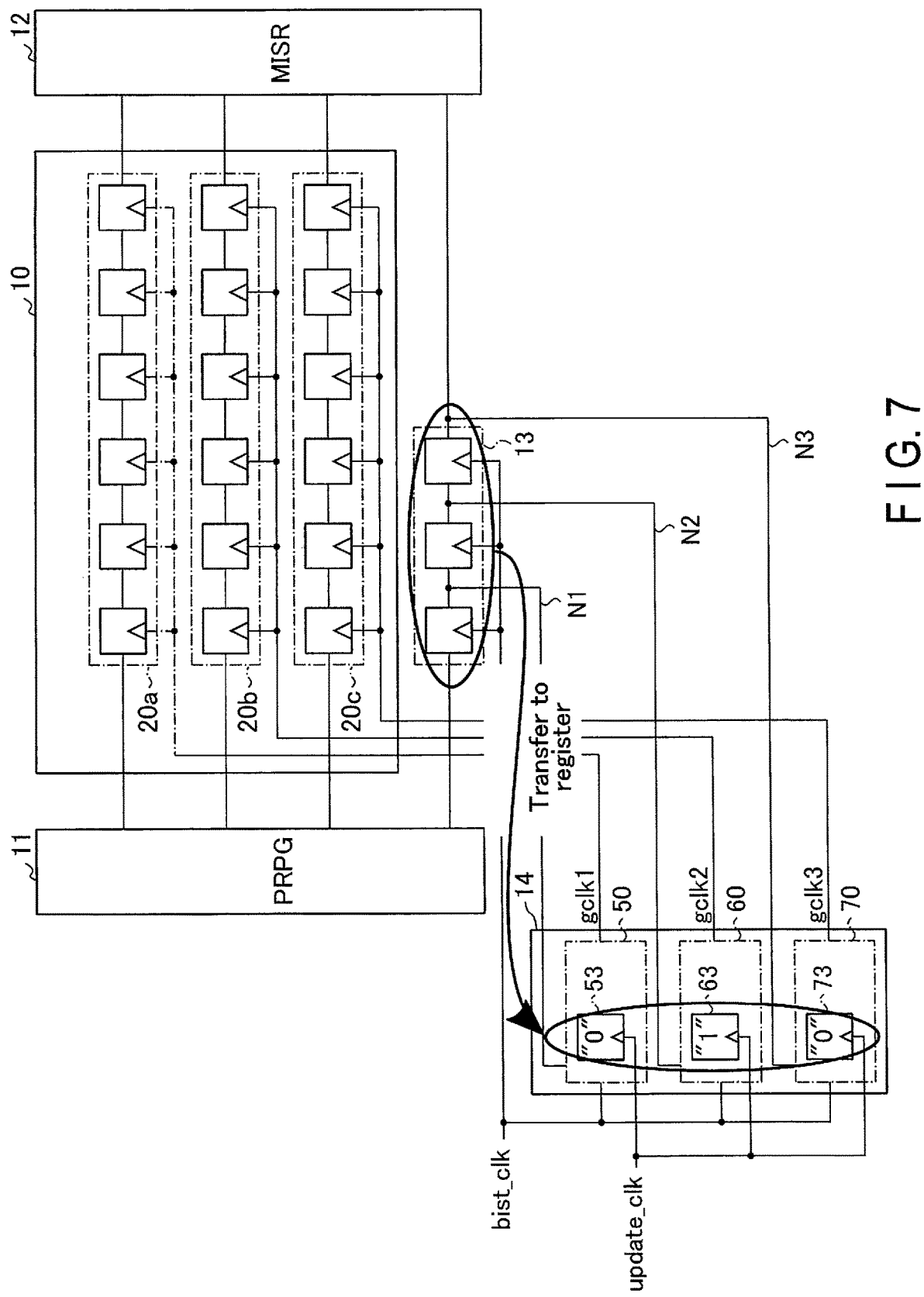

As illustrated in FIG. 7, after the first scan shift operation (shift-in operation) is completed in the shift groups 20a to 20c, the shift group 20 on which the capture operation is to be executed is randomly selected based on the output data of the clock chain 13. More specifically, in the example of FIG. 7, the one-hot encoder 41 of the clock select circuit 14 outputs data "010", based on the value of the clock chain 13. As a result, data "0" is stored into the flip-flops 53 and 73, and data "1" is stored into the flip-flop 63. That is, data "010" is stored in the update register.

As illustrated in FIG. 8, in the state of data "010" stored in the update register, the clock select circuit 14 transmits the clock signal cp_clk2 as a clock signal gclk2 to the scan chain SC in the shift group 20b to execute the capture operation. At this timing, the clock signal bist_clk is transmitted from the clock generator 15 to the clock chain 13. In the example of FIG. 8, a 1-pulse clock signal gclk2 and a 1-pulse clock signal bist_clk are sent, but the number of pulses of these signals are not limited to one. For example, two or more pulses of clock signals gclk2 may be transmitted in order to deal with the delay in the test.

If a plurality of shift groups 20 are selected in the capture operation, the clock signals gclk (namely, clock signals cp_clk) may be sequentially transmitted at different timings.

As illustrated in FIG. 9, in the state of data "010" stored in the update register, the clock select circuit 14 transmits the clock signal bist_clk as a clock signal gclk2 to the scan chain SC of the shift group 20b to execute the scan shift operation. At this time, the clock signal bist_clk is transmitted from the clock generator 15 to the clock chain 13. The MISR 12 compresses the data shifted out of the scan chain SC of the shift group 20b and transmits this data to the comparator 30 of the logic BIST controller 16.

1.2.3. Timing Chart of Signals at Test

Figure 10:
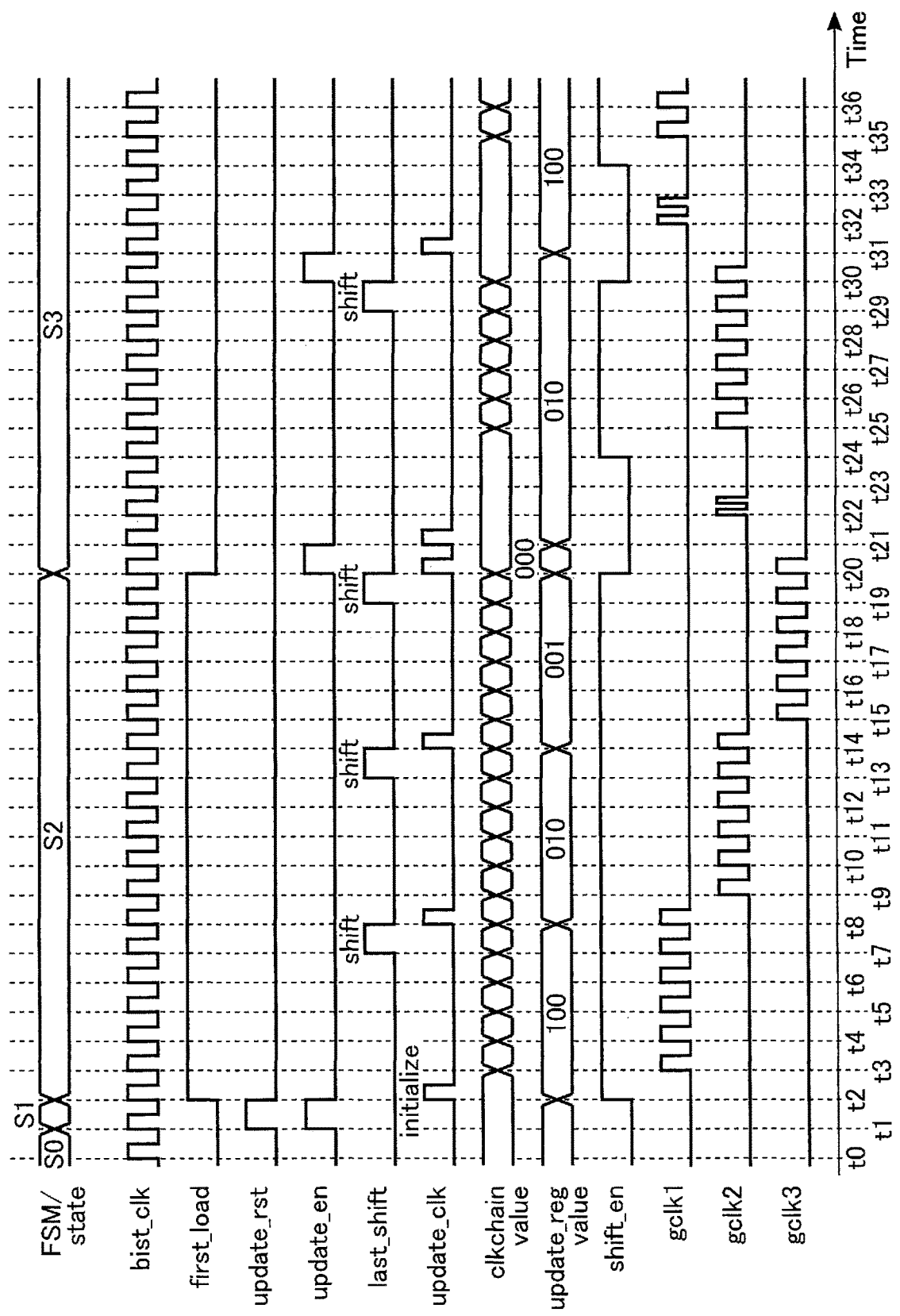
FIG. 10 is a timing chart of signal lines of the semiconductor integrated circuit according to the first embodiment during the LBIST.

Next, the timings of signals at the test will be explained with reference to FIG. 10. FIG. 10 is a timing chart of clock signals, as well as control signals output by the FSM 31, during the test.

As illustrated in FIG. 10, the FSM 31 controls the test in accordance with the test period, which is roughly divided into four states S0 to S3. State S0 between times t0 and t1 indicates, for example, the initialization period for the logic BIST controller 16. State S1 between times t1 and t2 indicates the preparation period for inputting the initial value (e.g., data "100") to the update register prior to the first scan shift operation (shift-in operation). State S2 between times t2 and t20 indicates the period of executing the first scan shift operation (shift-in operation) on the shift groups 20a to 20c. The capture operation is therefore not executed in state S2. State S3 after time t20 indicates the period of the capture operation and the second and subsequent scan shift operations, which are executed after the first shift-in operation. In state S3, when any of data "100", "010" or "001" is stored into the update register, the capture operation and scan shift operation are sequentially executed in the corresponding scan chain SC. During the period of the capture operation and scan shift operation, the clock select circuit 14 transmits clock signals gclk to the corresponding scan chain SC. Here, the clock signals gclk may differ in frequency between the capture operation and scan shift operation.

First, at time t0 in state S0, the clock generator 15 begins transmission of the clock signal bist_clk. The FSM 31 sets the first load signal first_load, update reset signal update_rst, update enable signal update_en, last shift signal last_shift, and shift_enable signal shift_en to the "L" level.

Next, the FSM 31 shifts the state from S0 to S1. During the period between times t1 and t2, the FSM 31 sets the update reset signal update_rst and update enable signal update_en to the "H" level. As a result, data "1" is input to the input terminal ("1") of the multiplexer 52 of the clock select circuit 14, while data "0" is input to the input terminals ("1") of the multiplexers 62 and 72.

Next, the FSM 31 shifts the state from S1 to S2. At time t2, the FSM 31 sets the first load signal first_load and shift enable signal shift_en to the "H" level, and the update reset signal update_rst and update enable signal update_en to the "L" level. In this manner, during the period of times t2 to t3, the update clock signal update_clk is set to the "H" level in synchronization with the clock signal bist_clk. Two signals in synchronization may include signals having a delay error due to a circuit. In this manner, data "100" is stored in the update register ("update_reg value" in FIG. 10).

During the period of times t3 to t9, the clock signal gclk1 is generated in the clock select circuit 14 to be synchronous with the clock signal bist_clk. The number of pulses of the clock signal gclk is determined based on the number of flip-flops 21 in the scan chain SC. During this period in the scan chain SC, the test pattern randomly generated by the PRPG 11 is shifted in at the timing of the clock signal gclk1 rising to the "H" level ("clkchain value" in FIG. 10).

During the period of times t7 to t8, for example, the FSM 31 sets the last shift signal last_shift to the "H" level. For example, the FSM 31 counts the number of pulses of the clock signals gclk1 to gclk3, and sets the last shift signal last_shift to the "H" level in the scan shift operation before transmission of the last pulse of any of the clock signals gclk1 to gclk3. During the period of times t8 to t9, with the first load signal first_load and last shift signal last_shift at the "H" level, the update clock signal update_clk is set to the "H" level in synchronization with the clock signal bist_clk.

At time t8, data "010" is stored in the update register at the timing of the update clock signal update_clk rising to the "H" level.

During the period of times t9 to t15, the clock signal gclk2 is generated in synchronization with the clock signal bist_clk in the clock select circuit 14. During this period in the scan chain SC, a test pattern pseudo-randomly generated in the PRPG 11 is shifted in at the timing of the clock signal bist_clk rising to the "H" level.

During the period of times t13 to t14, the FSM 31 sets the last shift signal last_shift to the "H" level. With the first load signal first_load and the last shift signal last_shift at the "H" level, the update clock signal update_clk is set to the "H" level during the period of times t14 to t15 in synchronization with the clock signal bist_clk.

At time t14, data "001" is stored into the update register at the timing of the update clock signal update_clk rising to the "H" level.

During the period of times t15 to t21, the clock signal gclk3 is generated in the clock select circuit 14 to be synchronous with the clock signal bist_clk. During this period in the scan chain SC, the test pattern randomly generated in the PRPG 11 is shifted in at the timing of the clock signal bist_clk rising to the "H" level. That is, in the scan chain SC, the data is shifted in during the period of generating any of the clock signals gclk1 to gclk3 (period of times t3 to t21) at the timing of the clock signal bist_clk rising to the "H" level.

During the period of times t19 to t20, the FSM 31 sets the last shift signal last_shift to the "H" level. With the first load signal first_load and last shift signal last_shift at the "H" level, the update clock signal update_clk is set to the "H" level in synchronization with the clock signal bist_clk during the period of times t20 to t21.

At time t20, data "000" is stored into the update register at the timing of the update clock signal update_clk rising to the "H" level.

Next, the FSM 31 shifts the state from S2 to S3. At time t20, the FSM 31 sets the first load signal first_load, last shift signal last_shift, and shift_enable signal shift_en to the "L" level.

During the period of times t20 to t21, the FSM 31 sets the update enable signal update_en to the "H" level. The clock select circuit 14 fetches the output data of the one-hot encoder 41 into each of the gclk-1 generator 50, gclk-2 generator 60, and gclk-3 generator 70 during the period of the update enable signal update_en being at the "H" level. Furthermore, during the period of times t21 to t22, after the update enable signal update_en at the "H" level, the update clock signal update_clk is set to the "H" level in synchronization with the clock signal bist_clk.

At time t21, for example, data "010" is stored into the update register at the timing of the update clock signal update_clk rising to the "H" level.

Next, at time t22, the clock select circuit 14 transmits the clock signal cp_clk2 as a clock signal gclk2 to the shift group 20b. In the example of FIG. 10, the frequency of the clock signal cp_clk2 differs from that of the clock signal bist_clk, where two pulses of the clock signal cp_clk2 are output in the period of times t22 to t23. In this manner, for example, the capture operation is executed during the period of times t22 to t23.

After the capture operation is completed, the FSM 31 sets the shift_enable signal shift_en to the "H" level during the period of times t24 to t30. The clock signal gclk2 synchronous with the clock signal bist_clk is thereby generated in the clock select circuit 14 during the period of times t25 to t31.

During the period of times t29 to t30, the FSM 31 sets the last shift signal last_shift to the "H" level.

During the capture operation and scan shift operation in each shift group 20, the processing of times t20 to t30 is repeated.

For example, during the period of times t30 to t31, the FSM 31 sets the update enable signal update_en to the "H" level. The clock select circuit 14 fetches the output data of the one-hot encoder 41 into each of the gclk-1 generator 50, gclk-2 generator 60 and gclk-3 generator 70 during the period of the update enable signal update_en being at the "H" level. Furthermore, after the update enable signal update_en at the "H" level, the update clock signal update_clk is set to the "H" level in synchronization with the clock signal bist_clk during the period of times t31 to t32.

At time t31, for example, data "100" is stored in the update register at the timing of the update clock signal update_clk rising to the "H" level.

Next, at time t32, the clock select circuit 14 transmits the clock signal cp_clk1 as a clock signal gclk1 to the shift group 20a. For example, the capture operation is thereby executed during the period of times t32 to t33.

After the capture operation is completed, the FSM 31 sets the shift_enable signal shift_en to the "H" level at time t34. In this manner, for example, during the period after time t35, the clock signal gclk1 synchronous with the clock signal bist_clk is generated in the clock select circuit 14.

1.3. Effects of Present Embodiment

The structure according to the present embodiment reduces the consumption of power required for the test. This effect will be described in detail.

In the LBIST, the test-targeted logic block of the logic circuit 10, or in other words all the flip-flops 21 in the scan chains SC, operate in unison in synchronization with a clock signal. For this reason, the power consumed for the LBIST tends to exceed the power required for ordinary operation of the logic circuit 10. The rapid increase of the power consumption may cause an IR drop, which reduces the power supply voltage. For example, this may cause an error in the test for determining a fault. In addition, if ordinary operation is being performed in a non-target logic block in parallel to the test, noise may be produced in signals, or, instantaneous power interruption may occur due to a decrease in the power supply voltage during ordinary operation.

In contrast, in the structure according to the present embodiment, the scan chains SC can be divided into shift groups 20 during the test, and one of the shift groups 20 is randomly selected to execute the scan shift operation and the capture operation of the test. In most cases, for example, when a test pattern is input to a plurality of scan chains SC in the test-targeted logic block at a time, only part of the scan chains SC affect the result of the test. For this reason, the scan shift operation and capture operation can be omitted for the scan chains SC that would not affect the result of the test. According to the present embodiment, a shift group 20, namely, a scan chain SC, is selected to execute the scan shift operation and capture operation, thereby reducing the power consumption for testing.

Furthermore, the structure according to the present embodiment can reduce the power consumption for testing. Thus, even when ordinary operation and the test are executed in parallel, generation of noise and instantaneous power interruption due to the reduced power source voltage can be suppressed in ordinary operation.

2. Second Embodiment

Next, the second embodiment will be explained. In the second embodiment, a circuit designing apparatus for designing the semiconductor integrated circuit of the first embodiment will be described.

2.1. Hardware Structure of Circuit Designing Apparatus

First, an exemplary hardware structure of the circuit designing apparatus will be explained with reference to FIG. 11. FIG. 11 is a block diagram showing the hardware structure of the circuit designing apparatus.

As illustrated in FIG. 11, the circuit designing apparatus 100 includes a CPU 101, a read only memory (ROM) 102, a random access memory (RAM) 103, a storage 104, a drive 105 and an interface 106. The circuit designing apparatus 100 has a function of inserting circuits required for executing the LBIST, circuits of scan chains SC, etc. and thereby generating a net list at the stage of designing the circuits in the semiconductor chip such as an LSI.

The CPU 101 executes various processing programs stored in the ROM 102 and uses the RAM 103 as a working area to control the entire operation of the circuit designing apparatus 100.

The storage 104 is an auxiliary storage device such as a hard disk drive (HDD) and a solid state drive (SSD). In the storage 104, an LBIST insertion program 143 is stored to be executed by the circuit designing apparatus 100. In addition, for example, a net list 141, specification information of design for testability (DFT) (hereinafter referred to as "DFT specifications") 142 and LBIST circuit information 144 are stored in the storage 104 as input information for executing the LBIST insertion program 143. A fault simulator program is also stored in the storage 104 to be executed by the circuit designing apparatus 100.

The net list 141 is the circuit data of the semiconductor integrated circuit 1. More specifically, the net list 141 represents information of conductors (i.e., net or wires) for electrically coupling various elements (logical gates such as AND circuits and exclusive OR circuits) to each other in the semiconductor chip to realize the targeted functions. In the net list 141, for example, the characteristics of signals communicated by way of each net are stored in association with the corresponding net.

The DFT specifications 142 represent information of the specifications of the design for testability that can facilitate the testing (including LBIST) of the elements in a semiconductor chip. The scan chains SC of the LBIST are designed in accordance with the DFT specifications.

The LBIST insertion program 143 is a program (software) to cause the circuit designing apparatus 100 to execute the process (design) for inserting the circuits and scan chains SC of the first embodiment into the circuit data based on the DFT specifications 142. The LBIST insertion program 143 will be described later in detail.

The LBIST circuit information 144 represents information of the circuit (hereinafter may be referred to as "LBIST circuit") for executing the LBIST for the control of each shift group 20. For example, the LBIST circuit having a shift group control mechanism includes the PRPG 11, MISR 12, clock chain 13, clock select circuit 14, and logic BIST controller 16 of the first embodiment.

The fault simulation execution program 145 executes a fault simulation of a designed circuit. In the example of FIG. 11, the LBIST insertion program 143 and fault simulation execution program 145 are separately illustrated, but these programs may be combined into an LBIST circuit design program.

For example, the drive 105 is a compact disk (CD) drive, digital versatile disk (DVD) drive, etc., which serves as a device for reading programs from the storage medium 151. The type of the drive 105 may be suitably selected in accordance with the type of the storage medium 151. The above-mentioned net list 141, DFT specifications 142, LBIST insertion program 143, LBIST circuit information 144, and fault simulation execution program 145 may be stored in this storage medium 151.

The storage medium 151 is a medium for storing information such as programs through an electrical, magnetic, optical, mechanical or chemical action in a manner such that a computer or any other device or machine can read the stored information such as programs.

The interface 106 is responsible for exchanging information between the circuit designing apparatus 100 and external devices. For example, the interface 106 includes interfaces of any type such as a communication interface adopting any wired or wireless communication system, a printer, and a graphical user interface (GUI) using a display screen (e.g., liquid crystal display (LCD), electroluminescence (EL) display and cathode ray tube). The interface 106 has a function of outputting and presenting to the user a scan/LBIST-inserted net list 201, a fault detection rate report 202, and a test pattern 203, which are generated in accordance with the LBIST insertion program 143 executed in the circuit designing apparatus 100. That is, the interface 106 serves as an output unit (circuit) for outputting the scan/LBIST-inserted net list 201, fault detection rate report 202, and test pattern 203.

The scan/LBIST-inserted net list 201 represents information of the net list obtained after the execution of the LBIST insertion program 143.

The fault detection rate report 202 relates to the result of the fault detection obtained through the fault simulation executed in accordance with the fault simulation execution program 145.

The test pattern 203 is used for the LBIST.

2.2. Functional Structure of Circuit Designing Apparatus

Figure 12:
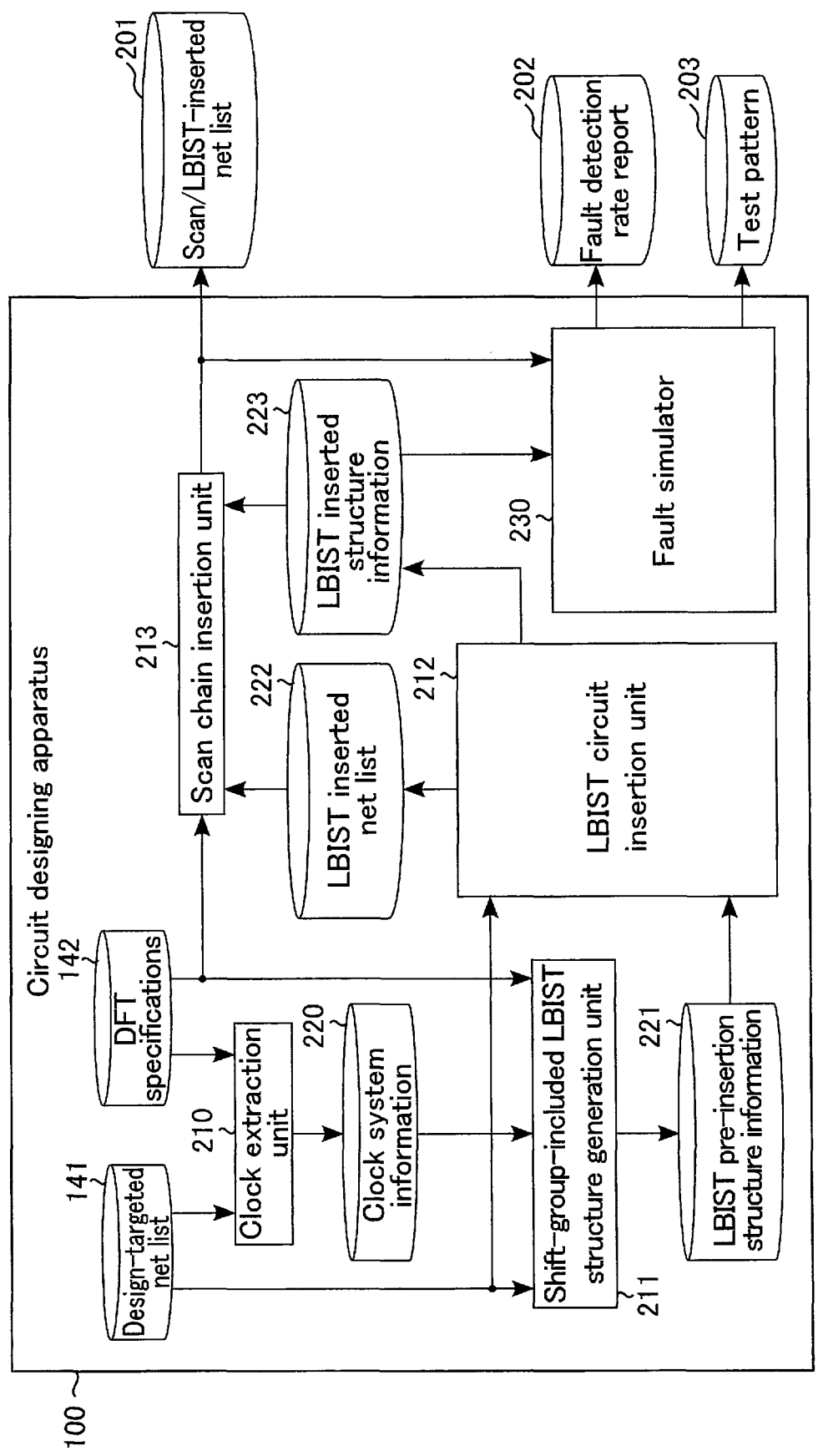
FIG. 12 is a block diagram showing the functional structure of the circuit designing apparatus according to the second embodiment.

Next, an exemplary functional structure of the circuit designing apparatus 100 will be explained with reference FIG. 12. FIG. 12 is a block diagram for explaining the functional structure of the circuit designing apparatus 100.

The CPU 101 of the circuit designing apparatus 100 expands in the RAM 103 the LBIST insertion program 143 or fault simulation execution program 145, for example, stored in the storage 104. The CPU 101 interprets and executes the LBIST insertion program 143 or fault simulation execution program 145 expanded in the RAM 103 to control the structural elements.

As illustrated in FIG. 12, when executing the LBIST insertion program 143, the circuit designing apparatus 100 functions as a computer including a clock extraction unit (i.e., extraction circuit or extractor) 210, a shift-group-included LBIST structure generation unit (i.e., generation circuit or generator) 211, an LBIST circuit insertion unit (i.e., insertion circuit or inserter) 212, and a scan chain insertion unit (i.e., insertion circuit or inserter) 213. Furthermore, when executing the LBIST insertion program 143, the circuit designing apparatus 100 functions as a computer configured to generate as intermediate products, clock system information 220, LBIST pre-insertion structure information 221, an LBIST inserted net list 222, and LBIST inserted structure information 223 through the shift-group-included LBIST structure generation unit 211, LBIST circuit insertion unit 212, and scan chain insertion unit 213; and ultimately output the scan/LBIST-inserted net list 201.

The clock extraction unit 210 extracts (outputs) the clock system information 220 of various clock signals used in ordinary operation and testing of the design-targeted semiconductor integrated circuit 1, based on the net list 141 and DFT specifications 142. The clock system information 220 includes, for example, as test-related information, information of the clock signals bist_clk, gclk1 to gclk3, and cp_clk1 to cp_clk3 used for the control of the shift group 20. The clock extraction unit 210 transmits the clock system information 220 to the shift-group-included LBIST structure generation unit 211.

The shift-group-included LBIST structure generation unit 211 generates the LBIST pre-insertion structure information 221 based on the net list 141, DFT specifications 142, clock system information 220, LBIST circuit information 144 (not shown in the drawings), etc. The LBIST pre-insertion structure information 221 includes the connection terminal information and polarity information of the LBIST signals, the connection terminal information and frequency information of the clock signals corresponding to the shift groups 20, information of the numbers and lengths of the scan chains SC (number of flip-flops 21) in each shift group 20, information of the number of cycles of the clock signal gclk in the capture operation, information of the upper limit of the number of test patterns, and information of the upper limit of the toggle rate of the flip-flops 21 in the test. The LBIST signals include signals corresponding to the setting of the operation mode of the LBIST, initial data to be input to the PRPG 11, the expected values for the initial data, or signals corresponding to pass/fail of the fault detection. The LBIST pre-insertion structure information 221 further includes the information of the structure of the LBIST circuit having a shift group control mechanism. That is, the shift-group-included LBIST structure generation unit 211 generates an LBIST circuit having a shift group control mechanism. More specifically, the LBIST pre-insertion structure information 221 includes information of the PRPG 11, MISR 12, clock chains 13 corresponding to shift groups 20, clock select circuit 14 and logic BIST controller 16. The shift-group-included LBIST structure generation unit 211 transmits the LBIST pre-insertion structure information 221 to the LBIST circuit insertion unit 212.

The LBIST circuit insertion unit 212 inserts the structure of the LBIST circuit into the net list 141 based on the net list 141 and LBIST pre-insertion structure information 221 to generate the LBIST inserted net list 222 and LBIST inserted structure information 223. The LBIST inserted structure information 223 includes the connection terminal information and polarity information of the LBIST signal; information of the LBIST control register; sequence information; connection terminal information and frequency information of the clock signals corresponding to the shift groups 20; information of the structure of the PRPG 11 and MISR 12 (i.e., generating polynomials for generating and compressing a test pattern); connection terminal information of the scan chains SC of each shift group 20; information of the number of cycles of the clock signal gclk in the capture operation; information of the upper limit of the number of test patterns; and information of the upper limit of the toggle rate of the flip-flops 21 in the test. The LBIST control register is arranged in the semiconductor integrated circuit 1 to be used for control of the LBIST. For example, the LBIST control register is set in serial by the LBIST signal. For example, the logic BIST controller 16, etc. operates based on the information held in the LBIST control register. The sequence information includes information of a sequence for setting the LBIST control register, a sequence for starting the LBIST test, and a sequence used when reading the result of the fault determination from the semiconductor integrated circuit 1. The LBIST circuit insertion unit 212 transmits the LBIST inserted net list 222 and LBIST inserted structure information 223 to the scan chain insertion unit 213. The LBIST inserted structure information 223 is used in the fault simulation, which will be described later.

The scan chain insertion unit 213 generates the structure of scan chains SC in each of the shift groups 20, based on the LBIST inserted net list 222 and LBIST inserted structure information 223. The scan chain insertion unit 213 inserts the generated structure of the scan chains SC into the LBIST inserted net list 222 to generate a scan/LBIST-inserted net list 201. The scan chain insertion unit 213 outputs this scan/LBIST-inserted net list 201 to an external device.

Furthermore, the circuit designing apparatus 100 functions as a computer including a fault simulator 230 when executing the fault simulation execution program 145 after generating the LBIST inserted structure information 223 and scan/LBIST-inserted net list 201. The circuit designing apparatus 100 further functions as a computer that outputs a fault detection rate report 202 and test pattern 203 by executing the fault simulation.

The fault simulator 230 generates a test pattern 203 for the LBIST, based on the LBIST inserted structure information 223 and scan/LBIST-inserted net list 201, and executes a fault simulation in the LBIST. Based on the result of the fault simulation, the fault simulator 230 calculates a fault detection rate. The fault simulator 230 outputs the generated test pattern 203 and the fault detection rate report 202 based on the result of the fault simulation to the external device.

With the above functional structure, the circuit designing apparatus 100 can design a circuit corresponding to the LBIST and execute a fault simulation.

The clock extraction unit 210, shift-group-included LBIST structure generation unit 211, LBIST circuit insertion unit 212, scan chain insertion unit 213, and fault simulator 230 may be realized by circuits specially designed and arranged in the circuit designing apparatus 100.

2.3. Flow of Circuit Designing

Next, the flow of the circuit designing will be explained with reference to FIG. 13. FIG. 13 is the flowchart of the circuit designing.

As illustrated in FIG. 13, first, the CPU 101 expands in the RAM 103 the LBIST insertion program 143 read from the storage 104. That is, the CPU 101 starts the LBIST insertion program 143.

The CPU 101 operates as a clock extraction unit 210, extracting the clock system information 220 of the design-targeted net list 141 from the net list 141 and DFT specifications 142 (step S20). The CPU 101 stores the extracted clock system information 220, for example, in the storage 104.

Next, the CPU 101 operates as a shift-group-included LBIST structure generation unit 211, generating an LBIST circuit having a shift group control mechanism, based on the net list 141, DFT specifications 142, clock system information 220, and LBIST circuit information 144 (step S21). That is, the CPU 101 generates the LBIST pre-insertion structure information 221. The CPU 101 stores the generated LBIST pre-insertion structure information 221, for example, in the storage 104.

Next, the CPU 101 operates as an LBIST circuit insertion unit 212, inserting the LBIST circuit into the net list 141, based on the net list 141 and LBIST pre-insertion structure information 221 (step S22). That is, the CPU 101 generates the LBIST inserted net list 222 and LBIST inserted structure information 223. The CPU 101 stores the LBIST inserted net list 222 and LBIST inserted structure information 223, for example, in the storage 104.

Next, the CPU 101 operates as a scan chain insertion unit 213, generating scan chains SC based on the LBIST inserted net list 222 and LBIST inserted structure information 223 (step S23). That is, the CPU 101 generates a scan/LBIST-inserted net list 201.

Next, the CPU 101 expands in the RAM 103 the fault simulation execution program 145 read from the storage 104. That is, the CPU 101 starts the fault simulation execution program 145.

The CPU 101 generates a test pattern 203, based on the LBIST inserted structure information 223 and scan/LBIST-inserted net list 201 (step S24).

Next, the CPU 101 executes a fault simulation, based on the generated test pattern 203 (step S25), and generates a fault detection rate report 202.

After the fault simulation is completed, the CPU 101 outputs the scan/LBIST-inserted net list 201, test pattern 203, and fault detection rate report 202 to an external device (step S26).

2.4. Effects of Present Embodiment

According to the present embodiment, a semiconductor integrated circuit configured to execute the LBIST of the first embodiment can be designed.

3. Modifications

A semiconductor integrated circuit according to above embodiments includes: a logic circuit (10) including a first scan chain (SC) configured to operate based on a first clock signal (gclk1) and a second scan chain (SC) configured to operate based on a second clock signal (gclk2) different from the first clock signal in a built-in self-test; a pattern generator (11) configured to generate a test pattern and transmit the test pattern to the first and second scan chains; a compression circuit (12) configured to compress first data received from the first and second scan chains; a clock select circuit (14) configured to select one of the first and second clock signals and transmit the one of the first and second clock signals to the corresponding one of the first and second scan chains in the test; and a test control circuit (16) configured to control the test and detect a fault in the logic circuit based on a result of the test.

According to the above embodiment, a semiconductor integrated circuit that can reduce the power consumption in a test can be offered.

The embodiments are not limited to the above, but various modifications can be made.

Furthermore, the term "couple" in the above-described embodiments includes, for example, indirect coupling with a transistor, a resistor, etc. interposed therebetween.

While certain embodiments have been described, these embodiments have been presented by way of example only, and are not intended to limit the scope of the inventions. Indeed, the novel methods and systems described herein may be embodied in a variety of other forms; furthermore, various omissions, substitutions and changes in the form of the methods and systems described herein may be made without departing from the spirit of the inventions. The accompanying claims and their equivalents are intended to cover such forms or modifications as would fall within the scope and spirit of the inventions.

What is claimed is:

1. A semiconductor integrated circuit comprising:
    a logic circuit including a first scan chain configured to operate based on a first clock signal and a second scan chain configured to operate based on a second clock signal different from the first clock signal;
    a pattern generator configured to generate a test pattern and transmit the test pattern to the first and second scan chains;
    a compression circuit configured to compress first data received from the first and second scan chains;
    a clock select circuit configured to select one of the first and second clock signals and transmit the one of the first and second clock signals to the corresponding one of the first and second scan chains;

a test control circuit configured to control a test and detect a fault in the logic circuit based on a result of the test; and a third scan chain configured to transmit second data to the clock select circuit based on the test pattern received from the pattern generator, wherein the clock select circuit is configured to select the one of the first and second clock signals based on the second data received from the third scan chain.

2. The semiconductor integrated circuit according to claim 1, wherein the test includes a capture operation and a scan shift operation, and the capture operation and the scan shift operation are sequentially executed in the one of the first and second scan chains in the test.

3. The semiconductor integrated circuit according to claim 2, wherein in a period of the capture operation and the scan shift operation being sequentially executed, the one of the first and second clock signals has a first frequency for the capture operation and a second frequency different from the first frequency for the scan shift operation.

4. The semiconductor integrated circuit according to claim 1, wherein when the test pattern is input to the first scan chain for a first time in the test, the clock select circuit is capable of selecting the first clock signal based on a control signal received from the test control circuit.

5. The semiconductor integrated circuit according to claim 1, wherein when the test pattern is input to the first scan chain for a second time in the test, the clock select circuit selects the first clock signal based on the second data.

6. The semiconductor integrated circuit according to claim 1, wherein the clock select circuit includes an encoder configured to generate third data based on the second data, and the clock select circuit is configured to select the one of the first and second clock signals based on the third data.

7. The semiconductor integrated circuit according to claim 6, wherein the third data includes at least 2 bits, one bit of the third data is data "1" and the other bits of the third data are data "0".

8. The semiconductor integrated circuit according to claim 1, wherein the first scan chain includes a plurality of flip-flops that are serially coupled to each other.

* * * * *